United States Patent
Aoki et al.

(10) Patent No.: US 8,601,191 B2
(45) Date of Patent: Dec. 3, 2013

(54) BUS SYSTEM AND DEADLOCK AVOIDANCE CIRCUIT THEREOF

(75) Inventors: Sumie Aoki, Tokyo (JP); Yoshito Katano, Kanagawa (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 13/137,191

(22) Filed: Jul. 27, 2011

(65) Prior Publication Data

US 2012/0079150 A1 Mar. 29, 2012

(30) Foreign Application Priority Data

Sep. 29, 2010 (JP) ................................ 2010-218612

(51) Int. Cl.
*G06F 13/14* (2006.01)
*G06F 13/40* (2006.01)
*G06F 13/16* (2006.01)

(52) U.S. Cl.
CPC ........ *G06F 13/4036* (2013.01); *G06F 13/1621* (2013.01); *G06F 13/1626* (2013.01)
USPC ................. 710/241; 710/6; 710/32; 710/110; 710/200

(58) Field of Classification Search
USPC ........................................ 710/110
See application file for complete search history.

(56) References Cited

U.S. PATENT DOCUMENTS

| | | | | |
|---|---|---|---|---|
| 5,761,454 A * | 6/1998 | Adusumilli et al. | ........... | 710/311 |
| 5,933,612 A * | 8/1999 | Kelly et al. | ................... | 710/311 |
| 5,949,981 A * | 9/1999 | Childers | ........................ | 710/310 |
| 5,961,623 A * | 10/1999 | James et al. | .................. | 710/113 |
| 6,108,739 A * | 8/2000 | James et al. | .................. | 710/113 |
| 7,219,178 B2 * | 5/2007 | Harris et al. | .................. | 710/110 |
| 7,500,035 B2 * | 3/2009 | Johns et al. | ................... | 710/113 |
| 7,558,895 B2 * | 7/2009 | Bruce | ........................... | 710/110 |
| 7,802,040 B2 * | 9/2010 | Aldworth et al. | ............. | 710/118 |
| 7,917,676 B2 * | 3/2011 | Sullivan et al. | ............... | 710/110 |
| 2001/0032282 A1 * | 10/2001 | Marietta et al. | ............... | 710/200 |
| 2006/0075169 A1 * | 4/2006 | Harris et al. | .................. | 710/110 |
| 2008/0040523 A1 * | 2/2008 | Bruce | ........................... | 710/110 |
| 2008/0071955 A1 * | 3/2008 | Johns et al. | ................... | 710/113 |
| 2008/0276022 A1 * | 11/2008 | Le et al. | ......................... | 710/108 |
| 2010/0005208 A1 * | 1/2010 | Sullivan et al. | ............... | 710/110 |
| 2012/0131246 A1 * | 5/2012 | Jeong et al. | ................... | 710/110 |
| 2012/0159037 A1 * | 6/2012 | Kwon et al. | ................... | 710/317 |
| 2012/0290752 A1 * | 11/2012 | Lim | ............................. | 710/110 |

FOREIGN PATENT DOCUMENTS

JP 2008-041099 2/2008

* cited by examiner

*Primary Examiner* — Ryan Stiglic
(74) *Attorney, Agent, or Firm* — Rader, Fishman & Grauer PLLC

(57) ABSTRACT

Disclosed herein is a deadlock avoidance circuit including: a previous-transaction-information management section; a transaction-issuance-termination determination section; and a response-outputting control section.

16 Claims, 27 Drawing Sheets

FIG. 3

| SIGNAL NAME | SOURCE | MEANING |
|---|---|---|
| ARID[3:0] | MASTER | READ-ADDRESS INDENTIFIER |
| ARADDR[31:0] | MASTER | READ-ADDRESS |
| ARLEN[3:0] | MASTER | BURST LENGTH |
| ARSIZE[2:0] | MASTER | BURST SIZE |
| ARBURST[1:0] | MASTER | BURST TYPE |
| ARLOCK[1:0] | MASTER | LOCK TYPE |
| ARCACHE[3:0] | MASTER | CACHE TYPE |
| ARPROT[2:0] | MASTER | PROTECTION TYPE |
| ARVALID | MASTER | READ-ADDRESS VALIDITY |
| ARREADY | SLAVE | READ-ADDRESS READINESS |

FIG.4

| SIGNAL NAME | SOURCE | MEANING |
|---|---|---|
| RID[3:0] | SLAVE | READ-IDENTIFIER TAG |
| RDATA[31:0] | SLAVE | READ DATA |
| RRESP[1:0] | SLAVE | READ RESPONSE |
| RLAST | SLAVE | LAST READ (BURST LAST TRANSFER) |
| RVALID | SLAVE | READ VALIDITY |
| RREADY | MASTER | READ READINESS |

FIG. 5

| SIGNAL NAME | SOURCE | MEANING |
| --- | --- | --- |
| AWID[3:0] | MASTER | WRITE ADDRESS IDENTIFIER |
| AWADDR[31:0] | MASTER | WRITE ADDRESS |
| AWLEN[3:0] | MASTER | BURST LENGTH |
| AWSIZE[2:0] | MASTER | BURST SIZE |
| AWBURST[1:0] | MASTER | BURST TYPE |
| AWLOCK[1:0] | MASTER | LOCK TYPE |
| AWCACHE[3:0] | MASTER | CACHE TYPE |
| AWPROT[2:0] | MASTER | PROTECTION TYPE |
| AWVALID | MASTER | WRITE ADDRESS VALIDITY |
| AWREADY | SLAVE | WRITE ADDRESS READINESS |

F I G . 6

| SIGNAL NAME | SOURCE | MEANING |
|---|---|---|
| WID[3:0] | MASTER | WRITE-IDENTIFIER TAG |
| WDATA[31:0] | MASTER | WRITE DATA |
| WSTRB[3:0] | MASTER | WRITE STROBE |
| WLAST | MASTER | LAST WRITE (BURST LAST TRANSFER) |
| WVALID | MASTER | WRITE VALIDITY |
| WREADY | SLAVE | WRITE READINESS |

FIG. 7

| SIGNAL NAME | SOURCE | MEANING |
|---|---|---|
| BID[3:0] | SLAVE | RESPONSE IDENTIFIER |
| BRESP[1:0] | SLAVE | WRITE RESPONSE |
| BVALID | SLAVE | WRITE-RESPONSE VALIDITY |
| BREADY | MASTER | RESPONSE READINESS |

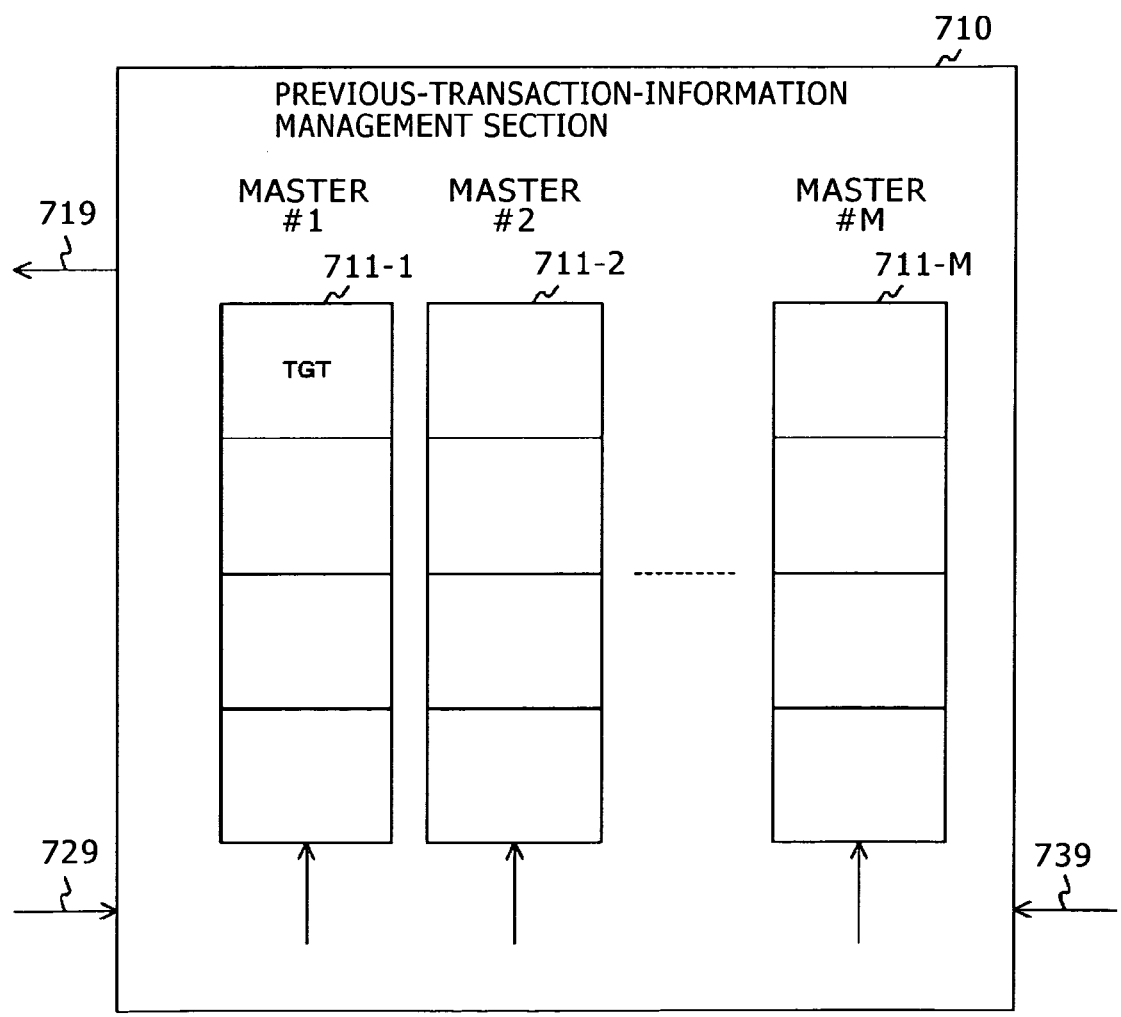

BUS SYSTEM AND DEADLOCK AVOIDANCE CIRCUIT THEREOF

BACKGROUND

The present disclosure relates to a bus system. More particularly, the present disclosure relates to a deadlock avoidance circuit employed in an interconnect of the bus system.

In a bus system, connected apparatus are linked to a bus (also referred to as an interconnect) and data is transferred among the connected apparatus. The connected apparatus playing a leading role in a transfer of data between two apparatus is referred to as a master whereas the other connected apparatus operating as a passive apparatus is referred to as a slave. Typically, a processor is assumed to be the connected apparatus referred to as a master whereas a memory is assumed to be the connected apparatus referred to as a slave.

In such a bus system, a sequence of operations referred to as transactions for transferring data includes a request for a transfer of the data and the actual transfer of the data. By controlling the request for a transfer of data and the actual transfer of the data independently of each other as split transactions, the efficiency of the transfer of the data can be improved. If a master issues transactions having a dependence relation to a plurality of slaves with the same timing for a case in which split transactions are allowed, on the other hand, this could cause a deadlock between a request for a transfer of data and the actual transfer of the data.

Here, let us assume a system in which masters M1 and M2 as well as slaves S1 and S2 are linked to an interconnect. Let the master M1 issue read transactions having a dependence relation to the slave S1 and, then, the slave S2 whereas the master M2 issue read transactions having a dependence relation to the slave S2 and, then, the slave S1.

In this case, the phrase stating "the master M1 issues read transactions having a dependence relation to the slave S1 and, then, the slave S2" implies that the master M1 provides the slaves S1 and S2 with respectively a first read address and a second read address following the first read address and expects to receive first data from the slave S1 and second data following the first data from the slave S2. By the same token, the phrase stating "the master M2 issues read transactions having a dependence relation to the slave S2 and, then, the slave S1" implies that the master M2 provides the slaves S2 and S1 with respectively a third read address and a fourth read address following the third read address and expects to receive third data from the slave S2 and fourth data following the third data from the slave S1.

The read addresses received by the slaves S1 and S2 are expressed as follows:

S1: $M1_1$ and $M2_2$
S2: $M2_1$ and $M1_2$

In the above expressions of the read addresses, the suffix appended to symbol M1 or M2 indicates whether the read address is an earlier read address from which earlier data will be read out by a slave and received by a master or a later read address from which later data will be read out by the slave and received by the master. For example, the read address $M1_2$ is a read address issued by the master M1 in a transaction and the suffix 2 appended to symbol M1 indicates that the master M1 expects to receive later data read out from the read address $M1_2$ as a result of the transaction. That is to say, symbols $M1_1$ and $M1_2$ denote respectively a first read address issued by the master M1 and a second read address issued by the master M1 after the read address $M1_1$ and, in this case, the master M1 expects to receive earlier data read out from the read address $M1_1$ and later data read out from the read address $M1_2$.

In this case, if each slave early outputs the data expected first by a master, no deadlock occurs. If every slave receives transaction read addresses from different masters and is put in a state of not being restricted by any data outputting order whatsoever, on the other hand, the slave may output data to the masters in any order. For the above case in which the slave S1 receives the read addresses $M1_1$ and $M2_2$ from the masters M1 and M2 respectively whereas the slave S2 receives the read addresses $M2_1$ and $M1_2$ from the masters M2 and M1 respectively, let us assume for example that the slave S1 makes an attempt to output the data read out from the read address $M2_2$ before the data read out from the read address $M1_1$ whereas the slave S2 makes an attempt to output the data read out from the read address $M1_2$ before the data read out from the read address $M2_1$. In this case, the masters M1 and M2 do not accept the pieces of data which the slaves S1 and S2 are trying to output. This is because the master M1 expects the slave S1 to first output the data read out from the read address $M1_1$ to the master M1 but it is the slave S2 that makes an attempt to first output the data read out from the read address $M1_2$ to the master M1. By the same token, the master M2 expects the slave S2 to first output the data read out from the read address $M2_1$ to the master M2 but it is the slave S1 that makes an attempt to first output the data read out from read address $M2_2$ to the master M2. As long as the master M1 does not accept the data read out from read address $M1_2$ and the master M2 does not accept the data read out from read address $M2_2$, the slave S1 cannot output the data read out from read address $M1_1$ as expected by the master M1 whereas the slave S2 cannot output the data read out from read address $M2_1$ as expected by the master M2. In this way, if a slave outputs pieces of data to a master in a changed order not expected by the master, a deadlock could occur.

In order to solve the deadlock problem described above, there has been proposed a technique for avoiding a deadlock by controlling the reordering of transactions. For example, there has been proposed a data processing apparatus for avoiding a deadlock by making the reordering of transactions impossible through aliasing to replace transaction identifiers with a single identifier. For more information on this data processing apparatus, the reader is advised to refer to documents such as Japanese Patent Laid-open No. 2008-041099 (FIG. 1).

SUMMARY

In accordance with the existing technology described above, reordering of transactions is not carried out in an attempt to prevent a deadlock from occurring. As long as issuance of addresses to all slaves is not monitored in the interconnect, however, it is naturally difficult to control the order of arrivals of addresses issued by a master to a plurality of slaves. Thus, the order of address arrivals at the slaves does not necessarily match the order in which the master issues the addresses. As a result, even if a slave does not demonstratively change the order of transaction, it is quite within the bounds of possibility that a deadlock occurs.

It is thus an aim of the present disclosure addressing the problems described above to provide a capability of preventing a deadlock from occurring to a bus system allowing simultaneous accesses to a plurality of slaves to be made by masters by adoption of a split-transaction technique.

In order to solve the problems described above in accordance with a first mode of the present disclosure, there is provided a deadlock avoidance circuit or a bus system employing the deadlock avoidance circuit. The deadlock avoidance circuit includes:

a previous-transaction-information management section for managing information on previous transactions issued before by a master associated with the deadlock avoidance circuit to any of a plurality of slaves;

a transaction-issuance-termination determination section for determining whether or not a most recent transaction newly issued by the master is a cause of a deadlock on the basis of the information on the previous transactions and for terminating the issuance of the most recent transaction if the most recent transaction is determined to be a cause of a deadlock; and a response-outputting control section for controlling an operation to pass on responses output by the slaves to the master so as to sustain a response outputting order expected in advance if responses have been output by the slaves to the master in response to the previous transactions in an order different from the response outputting order expected in advance.

Thus, the deadlock avoidance circuit brings about an effect of preventing a deadlock from occurring to the bus system allowing simultaneous accesses to a plurality of slaves.

In addition, the deadlock avoidance circuit according to the first mode of the present disclosure may further have a response saving buffer for saving responses if the responses have been output by the slaves to the master in response to the previous transactions in an order different from the response outputting order expected in advance. In this case, the transaction-issuance-termination determination section determines whether or not a most recent transaction newly issued by the master is a cause of a deadlock on the basis of the capacity of the response saving buffer. Thus, to a degree determined by the capacity of the response saving buffer, the deadlock avoidance circuit brings about an effect of allowing issuance of transactions which may possibly become a cause of a deadlock.

On top of that, in the deadlock avoidance circuit according to the first mode of the present disclosure, the response saving buffer can also be provided in any of the slaves. It is thus possible to bring about a function of a response saving buffer to any of the slaves.

In addition, in the deadlock avoidance circuit according to the first mode of the present disclosure, if responses have been output by the slaves to the master in response to the previous transactions in an order different from the response outputting order expected in advance, the response-outputting control section may carry out control to discard the responses and reissue the previous transactions for the discarded responses. Thus, the deadlock avoidance circuit brings about an effect of allowing issuance of a previous transaction which may possibly become a cause of a deadlock.

In addition, in accordance with a second mode of the present disclosure, there is provided a deadlock avoidance circuit or a bus system employing the deadlock avoidance circuit. The deadlock avoidance circuit includes:

a previous-transaction information management section for managing previous-transaction information including identifiers of slaves serving as objects of previous transactions issued previously by a plurality of masters to any of a plurality of the slaves and the order of the identifiers; and a transaction-issuance-termination determination section for determining whether or not a most recent transaction newly issued by any of the masters is a cause of a deadlock on the basis of the previous-transaction information and for terminating the issuance of the most recent transaction if the most recent transaction is determined to be a cause of a deadlock.

Thus, the deadlock avoidance circuit brings about an effect of terminating issuance of a most recent transaction if the most recent transaction is determined to be a cause of a deadlock.

In accordance with the present disclosure, it is possible to bring about an excellent effect of preventing a deadlock from occurring in a bus system allowing simultaneous accesses to a plurality of slaves to be made by masters by adoption of a split-transaction technique.

BRIEF DESCRIPTION OF THE DRAWINGS

FIG. 3 is a table showing signals transmitted through a read-address channel in accordance with an AXI protocol;

FIG. 4 is a table showing signals transmitted through a read-data channel in accordance with the AXI protocol;

FIG. 5 is a table showing signals transmitted through a write-address channel in accordance with the AXI protocol;

FIG. 6 is a table showing signals transmitted through a write-data channel in accordance with the AXI protocol;

FIG. 7 is a table showing signals transmitted through a write-response channel in accordance with the AXI protocol;

FIG. 20 is a diagram showing a typical configuration of a previous-transaction-information management section employed in the deadlock avoidance circuit to serve as a section according to the fourth embodiment of the present disclosure;

DETAILED DESCRIPTION OF THE PREFERRED EMBODIMENTS

Embodiments of the present disclosure are explained below by referring to the diagrams in the following order.

1: First Embodiment (Typical implementation of saving dependent responses in a response saving buffer)
2: Second Embodiment (Typical implementation of discarding dependent responses and doing a retry)
3: Third Embodiment (Typical implementation of using a slave to also function as the response saving buffer)
4: Fourth Embodiment (Typical implementation of managing requests made by all masters in an integrated manner)

1: First Embodiment

Overall Configuration of the Bus System

Figure 1:
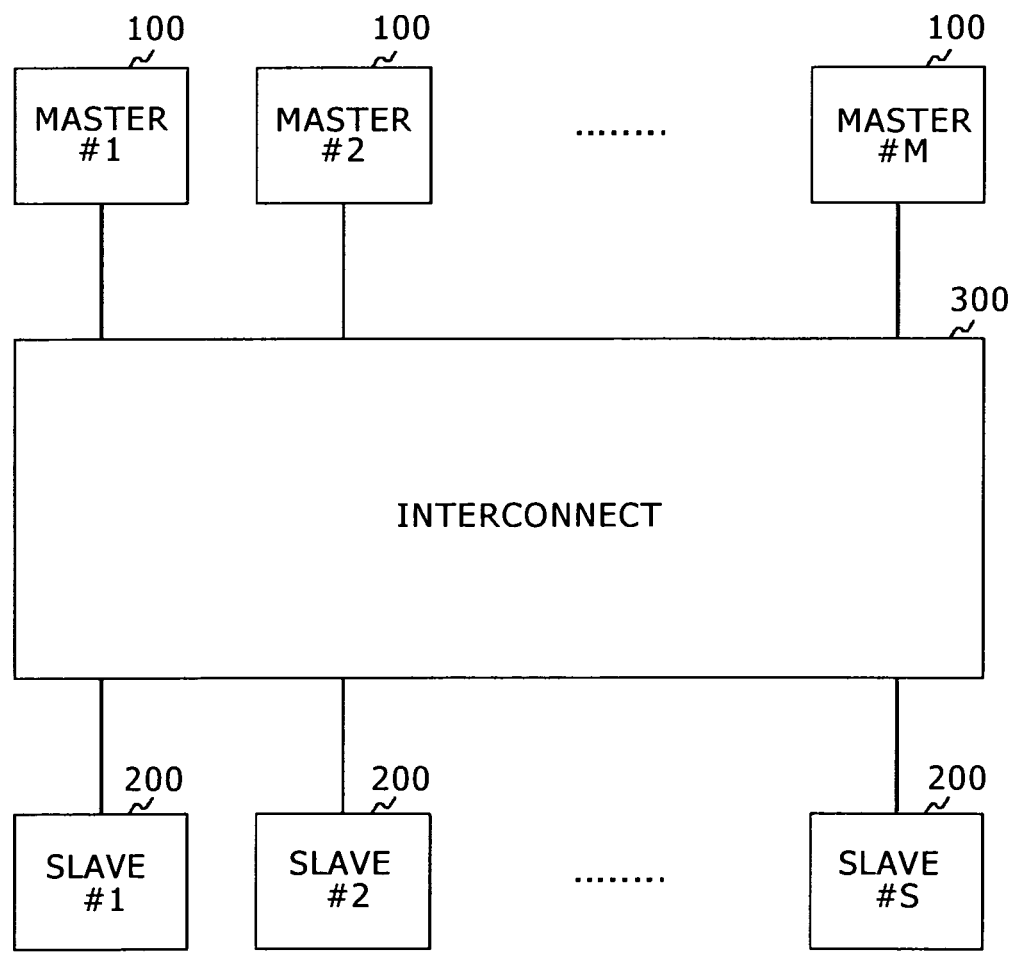
FIG. 1 is a block diagram showing a typical overall configuration of a bus system according to an embodiment of the present disclosure.

FIG. 1 is a block diagram showing a typical overall configuration of a bus system according to an embodiment of the present disclosure. In this bus system, an interconnect 300 functioning as a bus is linked to a plurality of connected apparatus. The connected apparatus are M masters 100 and S slaves 200. A master 100 is a connected apparatus playing a leading role in a transfer of data between the master 100 and a slave 200. On the other hand, a slave 200 is a passive connected apparatus in a transfer of data between the slave 200 and a master 100. A processor can be assumed to be a typical example of the master 100 whereas a memory can be assumed to be a typical example of the slave 200. It is to be noted that symbols M and S mentioned above are each an integer equal to or greater than 1.

Figure 2:
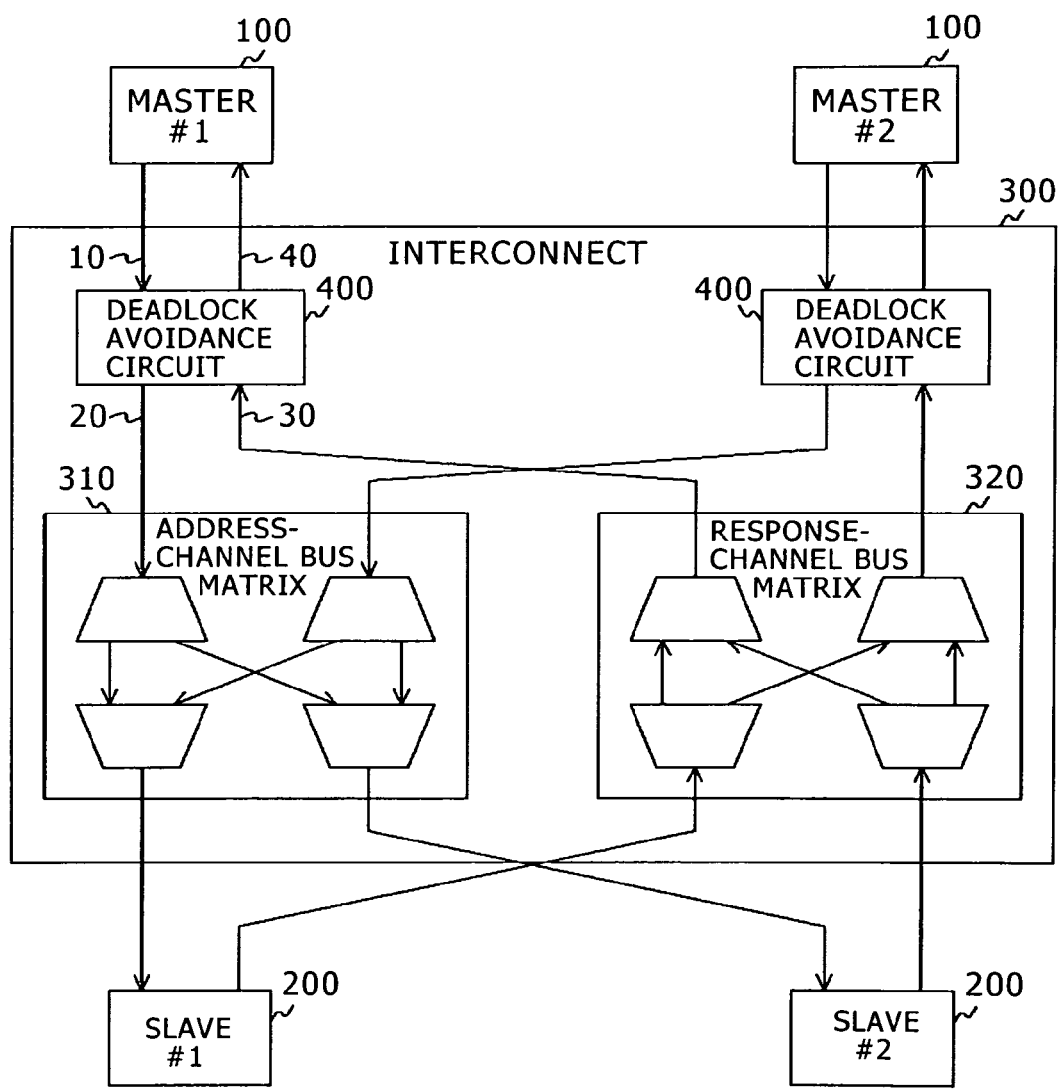
FIG. 2 is a block diagram showing a typical configuration of an interconnect employed in a bus system according to an embodiment of the present disclosure.

FIG. 2 is a block diagram showing a typical configuration of the interconnect 300 according to an embodiment of the present disclosure. The interconnect 300 shown in the figure is employed in a typical bus system including two masters 100 and two slaves 200.

In addition, as a representative example of a (split-transaction) bus implemented by the interconnect 300 for controlling a request for a transfer of data and the actual transfer of data independently of each other, an AXI (Advanced eXtensible Interface) protocol is assumed. In this AXI protocol, as paths for read operations, a read-address channel and a read-data channel are provided. When a master 100 issues a data-transfer request including a read address to a slave 200 through the read-address channel, the slave 200 transfers data to the master 100 through the read-data channel in response to the request for the transfer of data.

In addition, in the AXI protocol, as paths for write operations, a write-address channel, a write-data channel and a write-response channel are provided. When a master 100 issues a write-operation request including a write address and write data to a slave 200 through the write-address channel and the write-data channel respectively, the slave 200 carries out the write operation in response to the request for the write operation. Then, the slave 200 transfers a result of the write operation to the master 100 through the write-response channel.

In the AXI protocol, a set of a read-address channel and a read-data channel is used for carrying out a read transaction whereas a set of a write-address channel, a write-data channel and a write-response channel is used for carrying out a write transaction. As a general rule of the AXI protocol, channels used for carrying out the same transaction have the same identifier. If the same identifier is assigned to channels used for carrying out different transactions, it is necessary to assure the order in which the transactions are carried out so that the transactions become transactions having a dependence relation (or order dependence). Transactions having a dependence relation are transactions to be carried out in an order determined in advance.

In the case of the AXI protocol, a deadlock is caused by a reversed order of transmissions through a write-address channel and a write-response channel, a reversed order of transmissions through a read-address channel and a read-data channel or a reversed order of transmissions through a write-address channel and a write-data channel. Since essentially the same deadlock avoidance mechanism can be used for avoiding deadlocks of both read and write channels, in the following description, the write-address channel and the read-address channel are each referred to as an address channel used as a generic technical term for the write-address channel and the read-address channel whereas the write-response channel and the read-data channel are each referred to as a response channel which is a generic technical term for the write-response channel and the read-data channel.

An address-channel bus matrix 310 is a section used for handling connections of address channels whereas a response-channel bus matrix 320 is a section used for handling connections of response channels. The address-channel bus matrix 310 passes on a request issued by a master 100 to a slave 200 whereas the response-channel bus matrix 320 passes on a response generated by a slave 200 to a master 100.

In a first embodiment of the present disclosure, a deadlock avoidance circuit 400 is provided for each of the M masters 100. A deadlock avoidance circuit 400 is a circuit for controlling operations in order to prevent a transaction carried out by a master 100 associated with the deadlock avoidance circuit 400 from generating a deadlock. In such a transaction, signal lines 10 and 20 represent an address channel whereas signal lines 30 and 40 represent a response channel. For the sake of convenience, the arrow of every signal line is oriented in the same direction as the main signal conveyed by the signal line. In actuality, however, the signal line also conveys a control signal beside the main signal and the channel represented by the signal line is thus used for exchanging the control signal in both directions.

In the AXI protocol, when a validity signal and a readiness signal have been asserted on each of the address and response channels, information is propagated. That is to say, when a validity signal and a readiness signal have been asserted on each of the address and response channels, for example, read data is transferred from the slave 200 to the master 100. In the case of a read-address channel for example, a master 100 serving as a read-address transmission source sets a read address and the like, asserting a validity signal ARVALID of 1 on the read channel. At that time, a slave 200 on the read-address receiving side asserts a readiness signal ARREADY of 1 on the read channel as soon as the slave 200 becomes ready to receive the read address. Thus, when both the validity signal ARVALID of 1 and the readiness signal ARREADY of 1 have been asserted on the read channel, the read address and other information are transferred from the master 100 to the slave 200.

Channel Configurations in the AXI Protocol

FIG. 3 is a table showing signals transmitted through a read-address channel in accordance with the AXI protocol. A read-address channel between a master 100 and a slave 200 is a channel used for transferring a read address from the master 100 to the slave 200. To put it in detail, the read-address channel is used for transferring signals for conveying a read-address identifier, a read address, a burst length, a burst size, a burst type, a lock type, a cache type, a protection type, a read-address validity indicator and a read-address readiness indicator as shown in the table. The signals are transmitted from a master 100 to a slave 200 except the signal conveying the read-address readiness indicator which is transmitted from a slave 200 to a master 100.

The read-address identifier ARID [3:0] is a tag having 4 bits used for identifying a read-address group of the signal conveying the read-address identifier ARID [3:0]. In the AXI protocol, when a master 100 issues transactions to a slave 200, the same identifier is assigned to the transactions if the master 100 requests the slave 200 to sustain the order of the transactions. In other words, in the case of transactions having identifiers different from each other, sustainment of the order of the transactions is not assured.

The read address ARADDR [31:0] is a signal used for conveying a 32-bit read address from which data is to be read out. The read address is the address of initial data in a burst transfer.

The burst length ARLEN [3:0] is a 4-bit signal used for conveying the number of pieces of data in a burst transfer. The number of pieces of data in a burst transfer is a number in the range 1 to 16 and encoded into a code of 4 bits.

The burst size ARSIZE [2:0] is a 3-bit signal used for conveying a transfer size for every burst transfer. The transfer size is encoded into a 3-bit code representing n of the expression $2^n$. Since the transfer size represents n which is an integer in the range 1 to 7, the expression $2^n$ represents the expressions $2^0$, $2^1$, $2^2$, $2^3$, $2^4$, $2^5$, $2^6$ and $2^7$.

The burst type ARBURST [1:0] is a 2-bit signal used for conveying the type of computation of an address in the burst transfer. To put it concretely, the burst type ARBURST [1:0] is used to specify a FIFO type, a continuous-access type or a cache-line type.

The lock type ARLOCK [1:0] is a 2-bit signal used for conveying information for an atomic access. To put it concretely, the lock type ARLOCK [1:0] is used to specify a normal access, an exclusive access or an access with a lock.

The cache type ARCACHE [3:0] is a 4-bit signal used for conveying information required for controlling a cache memory. To put it concretely, the cache type ARCACHE [3:0] is used to specify control information such as whether or not data is cacheable, the operation is a write-through operation, the operation is a write-back operation or the like.

The protection type ARPROT [2:0] is a 3-bit signal used for conveying information required for controlling protection. To put it concretely, the protection type ARPROT [2:0] is used to specify a protection level such as a privileged access, an unsecured access and an instruction access.

The read address validity indicator ARVALID is a signal used for indicating the validity of an address or a control signal. On the other hand, the read address readiness indicator ARREADY generated by a slave 200 is a signal used for indicating whether or not the slave 200 has entered a state of being ready to receive an address or a control signal from a master 100. As described before, when both the read address validity indicator ARVALID and the read address readiness indicator ARREADY have been asserted on a channel between a master 100 and a slave 200, the address and the control signal are transmitted from the master 100 to the slave 200 through the channel.

FIG. 4 is a table showing signals transmitted through a read-data channel in accordance with the AXI protocol. The read-data channel between a master 100 and a slave 200 is a channel used for transferring read data from the slave 200 to the master 100. To put it in detail, the read-data channel is used for transferring signals for conveying a read identifier tag, read data, a read response, a last read, a read validity indicator and a read readiness indicator as shown in the table. The signals are transmitted from a slave 200 to a master 100 except the signal conveying the read readiness indicator which is transmitted from a master 100 to a slave 200.

The read identifier tag RID [3:0] is a tag having 4 bits used for identifying a read-data group of the signal conveying the read identifier tag RID [3:0]. The read identifier tag RID [3:0] is generated by a slave 200 and must match the read-address identifier ARID [3:0] described above.

The read data RDATA [31:0] is read data output by a slave 200 in a read transaction. In this case, the read-data bus is assumed to have a width of 32 bits. However, the number of bits of the read data RDATA varies in accordance with the width of the read-data bus. The read-data bus may have a width of 8, 16, 32, 64, 128, 256, 512 or 1,024 bits.

The read response RRESP [1:0] is a 2-bit signal used for indicating the state of a data transfer in a read transaction. Details of the read response RRESP [1:0] will be described later.

The last read RLAST is a signal used for indicating the last data transfer in a read transaction.

The read validity indicator RVALID is a signal used for indicating the validity of the requested read data. The read readiness indicator RREADY issued by a master 100 is a signal used for indicating whether or not the master 100 has entered a state of being ready to receive the requested read data from a slave 200. As explained before, when both the read validity indicator RVALID and the read readiness indicator RREADY have been asserted on a channel between a master 100 and a slave 200, the requested read data is transmitted from the slave 200 to the master 100 through the channel.

FIG. 5 is a table showing signals transmitted through a write-address channel in accordance with the AXI protocol. The write-address channel between a master 100 and a slave 200 is a channel used for transmitting a write address from the master 100 to the slave 200. To put it in detail, the write-address channel is used for transferring signals for conveying a write-address identifier, a write address, a burst length, a burst size, a burst type, a lock type, a cache type, a protection type, a write-address validity indicator and a write-address readiness indicator as shown in the table. The signals are transmitted from a master 100 to a slave 200 except the signal conveying the write-address readiness indicator which is transmitted from a slave 200 to a master 100.

The write-address identifier AWID [3:0] is a tag having 4 bits used for identifying a write-address group of the signal conveying the write-address identifier AWID [3:0]. The write address AWADDR [31:0] is a signal used for conveying a 32-bit write address into which data is to be written. The write address is the address of initial data in a burst transfer.

The burst length AWLEN [3:0] is a 4-bit signal used for conveying the number of pieces of data in a burst transfer. The burst size AWSIZE [2:0] is a 3-bit signal used for conveying a transfer size for every burst transfer. The burst type AWBURST [1:0] is a 2-bit signal used for conveying the type of computation of an address in the burst transfer. The lock type AWLOCK [1:0] is a 2-bit signal used for conveying information for an atomic access. The cache type AWCACHE [3:0] is a 4-bit signal used for conveying information required for controlling a cache memory. The protection type AWPROT [2:0] is a 3-bit signal used for conveying information required for controlling protection. The signals described above are basically the same as those transmitted through a read-address channel.

The write address validity indicator AWVALID is a signal used for indicating the validity of an address or a control signal. On the other hand, the write address readiness indicator AWREADY generated by a slave 200 for a master 100 is a signal used for indicating whether or not the slave 200 has entered a state of being ready to receive an address or a control signal from the master 100. As described before, when both the write address validity indicator AWVALID and the write address readiness indicator AWREADY have been asserted on a channel between a master 100 and a slave 200, the address and the control signal are transmitted from the master 100 to the slave 200 through the channel.

FIG. 6 is a table showing signals transmitted through a write-data channel in accordance with the AXI protocol. The write-data channel between a master 100 and a slave 200 is a channel used for transferring write data from the master 100 to the slave 200. To put it in detail, the write-data channel is used for transferring signals for conveying a write identifier tag, write data, a write strobe, a last write, a write validity indicator and a write readiness indicator as shown in the table. The signals are transmitted from a master 100 to a slave 200 except the signal conveying the write readiness indicator which is transmitted from a slave 200 to a master 100.

The write identifier tag WID [3:0] is a tag having 4 bits used for identifying a write-data group of the signal conveying the write identifier tag WID [3:0]. The write identifier tag WID [3:0] is generated by a master 100 and must match the write-address identifier AWID [3:0] described above.

The write data WDATA [31:0] is write data output by a master 100 to a slave 200 in a write transaction. In this case, the write-data bus is assumed to have a width of 32 bits. However, the number of bits of the write data WDATA varies in accordance with the width of the write-data bus. The write-data bus may have a width of 8, 16, 32, 64, 128, 256, 512 or 1,024 bits.

The write strobe WSTRB [3:0] is a 4-bit signal used for indicating a byte position in a memory employed in the slave 200. The byte position is the position of a byte to be updated with a byte of the write data. Every 8 bits of the write-data bus are associated with a bit of the write strobe WSTRB [3:0]. That is to say, the write strobe bit WSTRB [i] is associated with the write-data byte WDATA [(8×i)+7: (8×i)].

The last write WLAST is a signal used for indicating the last data transfer in a write transaction.

The write valid WVALID is a signal used for indicating the validity of the write data to be stored in a slave 200. The write readiness indicator WREADY issued by a slave 200 is a signal used for indicating whether or not the slave 200 has entered a state of being ready to receive the write data from a master 100 to be stored in the slave 200. As explained before, when both the write validity indicator WVALID and the write readiness indicator WREADY have been asserted on a channel between a master 100 and a slave 200, the write data is transmitted from the master 100 to the slave 200 through the channel.

FIG. 7 is a table showing signals transmitted through a write-response channel in accordance with the AXI protocol. The write-response channel is a channel for transmitting a result of a write transaction from a slave 200 to a master 100. To put it in detail, the write-response channel is used for transmitting signals for conveying a response identifier, a write response, a write response validity indicator and a response readiness indicator as shown in the table. The signals are transmitted from a slave 200 to a master 100 except the signal conveying the write readiness indicator which is transmitted from a master 100 to a slave 200.

The response identifier BID [3:0] is a 4-bit tag used for identifying a write response. The response identifier BID [3:0] must match the write-address identifier AWID [3:0] described earlier.

The write response BRESP [1:0] is a 2-bit signal used for indicating the state of a data transfer in a write transaction. Details of this signal will be described later.

The write response validity indicator BVALID is a signal indicating the validity of the write response. The response readiness indicator BREADY issued by a master 100 indicates whether or not the master 100 has entered a state of being ready to receive a write response from a slave 200. As explained before, when both the write response validity indicator BVALID and the response readiness indicator BREADY have been asserted on a channel between a master 100 and a slave 200, the write response is transmitted from the slave 200 to the master 100 through the channel.

Configuration of the Deadlock Avoidance Circuit

Figure 8:
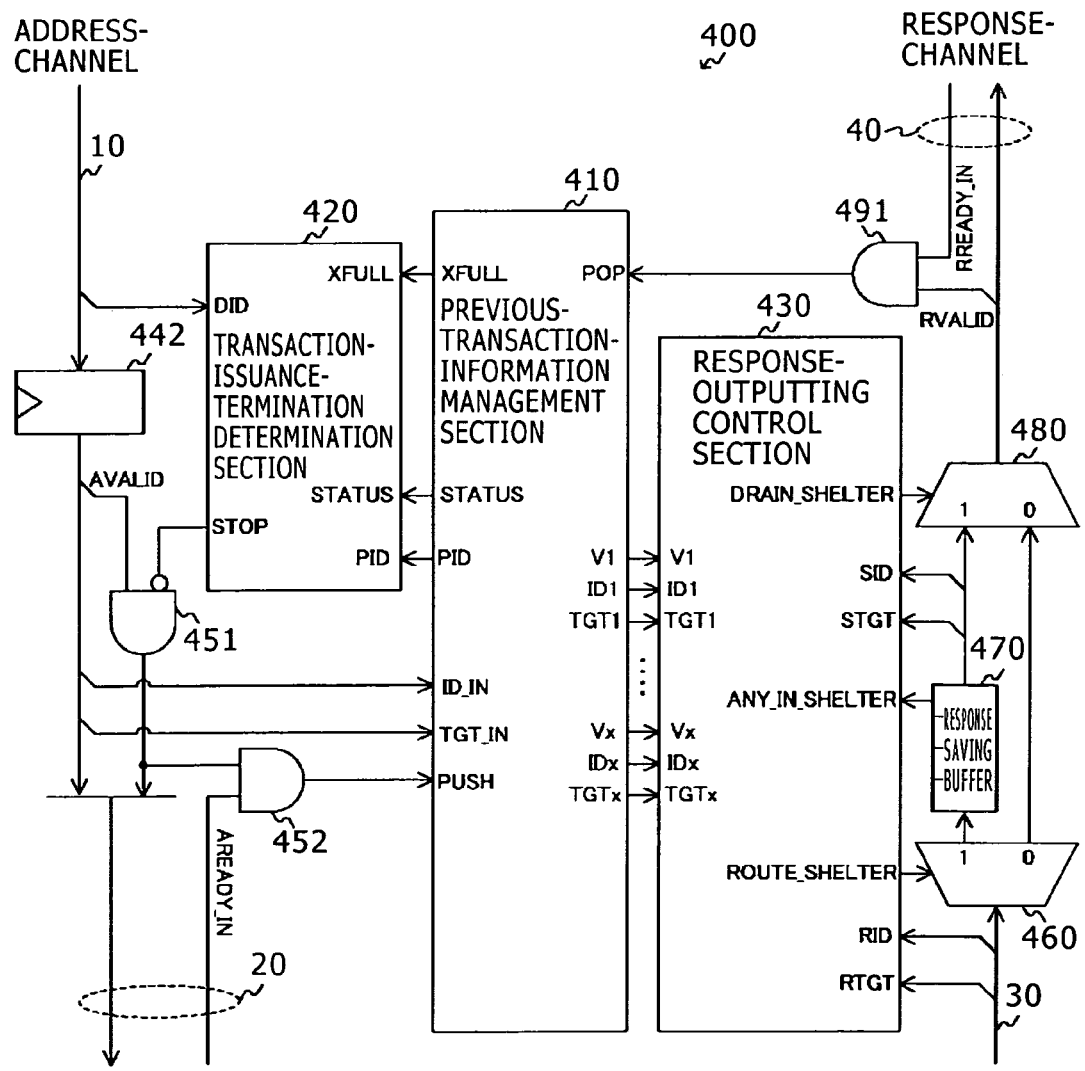
FIG. 8 is a block diagram showing a typical configuration of a deadlock avoidance circuit employed in an interconnect to serve as a circuit according to a first embodiment of the present disclosure.

FIG. 8 is a block diagram showing a typical configuration of a deadlock avoidance circuit 400 according to the first embodiment of the present disclosure. As shown in the figure, the deadlock avoidance circuit 400 employs a previous-transaction-information management section 410, a transaction-issuance-termination determination section 420, a response-outputting control section 430 and a response saving buffer 470. In addition, the deadlock avoidance circuit 400 also includes a latch 442, a logical-product gate 451, another logical-product gate 452, a demultiplexer 460, a multiplexer 480 and a further logical-product gate 491.

The previous-transaction-information management section 410 is a section for managing information on previous transactions issued before by the master 100 associated with the deadlock avoidance circuit 400 to any of a plurality of slaves 200. In the following description, the information on previous transactions is also referred to as previous-transaction information. The previous-transaction-information management section 410 has an information-management queue 411 for holding the previous-transaction information. The previous-transaction-information management section 410 supplies the previous-transaction information to the transaction-issuance-termination determination section 420 and the response-outputting control section 430.

On the basis of the previous-transaction information managed by the previous-transaction-information management section 410, the transaction-issuance-termination determination section 420 determines whether or not a most recent transaction newly issued by the master 100 associated with the deadlock avoidance circuit 400 is a cause of a deadlock. If the transaction-issuance-termination determination section 420 determines that the most recent transaction newly issued by the master 100 associated with the deadlock avoidance circuit 400 is a cause of a deadlock, the transaction-issuance-termination determination section 420 stops an operation to pass on the most recent transaction to a slave 200.

To put it in detail, from the previous-transaction-information management section 410, the transaction-issuance-termination determination section 420 receives an XFULL signal generated by the previous-transaction-information management section 410 to indicate that the information-management queue 411 employed in the previous-transaction-information management section 410 is not full yet, a STATUS signal conveying information on accesses made by the master 100 associated with the deadlock avoidance circuit 400 to any of different slaves 200 and a PID signal. The PID signal conveys the identifier of each transaction entailing an access to any of the different slaves 200: The STATUS signal conveys the number of accesses according to a transaction whose identifier is conveyed by the PID signal. In addition, from the master 100 associated with the deadlock avoidance circuit 400, the transaction-issuance-termination determination section 420 also receives a DID signal conveying the identifier of a most recent transaction newly issued by the master 100. On the basis of these pieces of information received from the previous-transaction-information management section 410 and the master 100 associated with the deadlock avoidance circuit 400, the transaction-issuance-termination determination section 420 determines whether or not the most recent transaction newly issued by the master 100 is a cause of a deadlock and, if the transaction-issuance-termination determination section 420 determines that the most recent transaction newly issued by the master 100 is a cause of a deadlock, the transaction-issuance-termination determination section 420 stops an operation to pass on the most recent transaction to a slave 200 by activating a STOP signal output to the logical-product gate 451.

It is to be noted that, as described above, the previous-transaction-information management section 410 generates the STATUS signal and the PID signal whereas the transaction-issuance-termination determination section 420 determines whether or not a most recent transaction newly issued by the master 100 associated with the deadlock avoidance circuit 400 is a cause of a deadlock on the basis of the STATUS signal and the PID signal. It is to be noted, however, that implementations of the present disclosure are by no means limited to this configuration. For example, it is also possible to provide a configuration in which the transaction-issuance-termination determination section 420 determines whether or not a most recent transaction newly issued by the master 100 associated with the deadlock avoidance circuit 400 is a cause of a deadlock by referring to all the contents of the information-management queue 411 employed in the previous-transaction-information management section 410.

The response-outputting control section 430 is a section for controlling responses to be passed on to the master 100 associated with the deadlock avoidance circuit 400 on the basis of the previous-transaction information managed by the previous-transaction-information management section 410. If the responses coming from a plurality of slaves 200 as responses to previous transactions arrive at the response-outputting control section 430 in an order different from a response outputting order expected in advance, the response-outputting control section 430 controls an operation to output the responses to the master 100 associated with the deadlock avoidance circuit 400 so that the order in which the responses are passed on to the master 100 matches the response outputting order expected in advance.

The response saving buffer 470 is a buffer used for saving responses coming from a plurality of slaves 200 as responses to previous transactions in case the responses arrive at the response-outputting control section 430 in an order different from a response outputting order expected in advance. The response-outputting control section 430 controls operations to supply responses to the response saving buffer 470 and read out responses from the response saving buffer 470 on the basis of the previous-transaction information managed by the previous-transaction-information management section 410.

The latch 442 is a memory used for holding signals coming from the master 100 associated with the address channel for the deadlock avoidance circuit 400. The logical-product gate 451 is a gate for masking the AVALID signal latched in the latch 442 in accordance with the STOP signal output by the transaction-issuance-termination determination section 420. That is to say, if the STOP signal requests that the AVALID signal be stopped, the AVALID signal is masked, causing the signals arriving through the address channel to be held in the latch 442.

The logical-product gate 452 is a gate for producing the logical product of an AREADY (AREADY_IN) signal coming from a slave 200 and a signal output by the logical-product gate 451. If a logical-product signal PUSH output by the logical-product gate 452 to the previous-transaction-information management section 410 is in an active state, a most recent transaction issued by the master 100 is held in the information-management queue 411 employed in the previous-transaction-information management section 410. That is to say, if both the AVALID signal output by the master 100 to the address channel and the AREADY (AREADY_IN) signal output by a slave 200 to the address channel are active, the logical-product gate 452 outputs the logical-product signal PUSH in an active state to the previous-transaction-information management section 410 in order to carry out an operation of pushing the most recent transaction to the information-management queue.

The demultiplexer 460 is a section for passing on a response coming from a slave 200 to the response saving buffer 470 or the master 100 by way of the multiplexer 480. The multiplexer 480 is a section for selecting a response coming directly from the demultiplexer 460 or a response temporarily held in the response saving buffer 470. The multiplexer 480 passes on the selected response to the master 100. The response-outputting control section 430 generates control signals for controlling the demultiplexer 460 and the multiplexer 480.

The logical-product gate 491 is a gate for producing the logical product of an RREADY (RREADY_IN) signal coming from the master 100 and the RVALID signal output by a slave 200. If a logical-product signal POP output by the logical-product gate 491 to the previous-transaction-information management section 410 is in an active state, a transaction held in the information-management queue 411 employed in the previous-transaction-information management section 410 is released. That is to say, if both the RREADY (RREADY_IN) signal output by the master 100 to the response channel and the RVALID signal output by a slave 200 to the response channel are active, the logical-product gate 491 outputs the logical-product signal POP in an active state to the previous-transaction-information management section 410 in order to carry out an operation of popping the transaction from the information-management queue.

Figure 9:
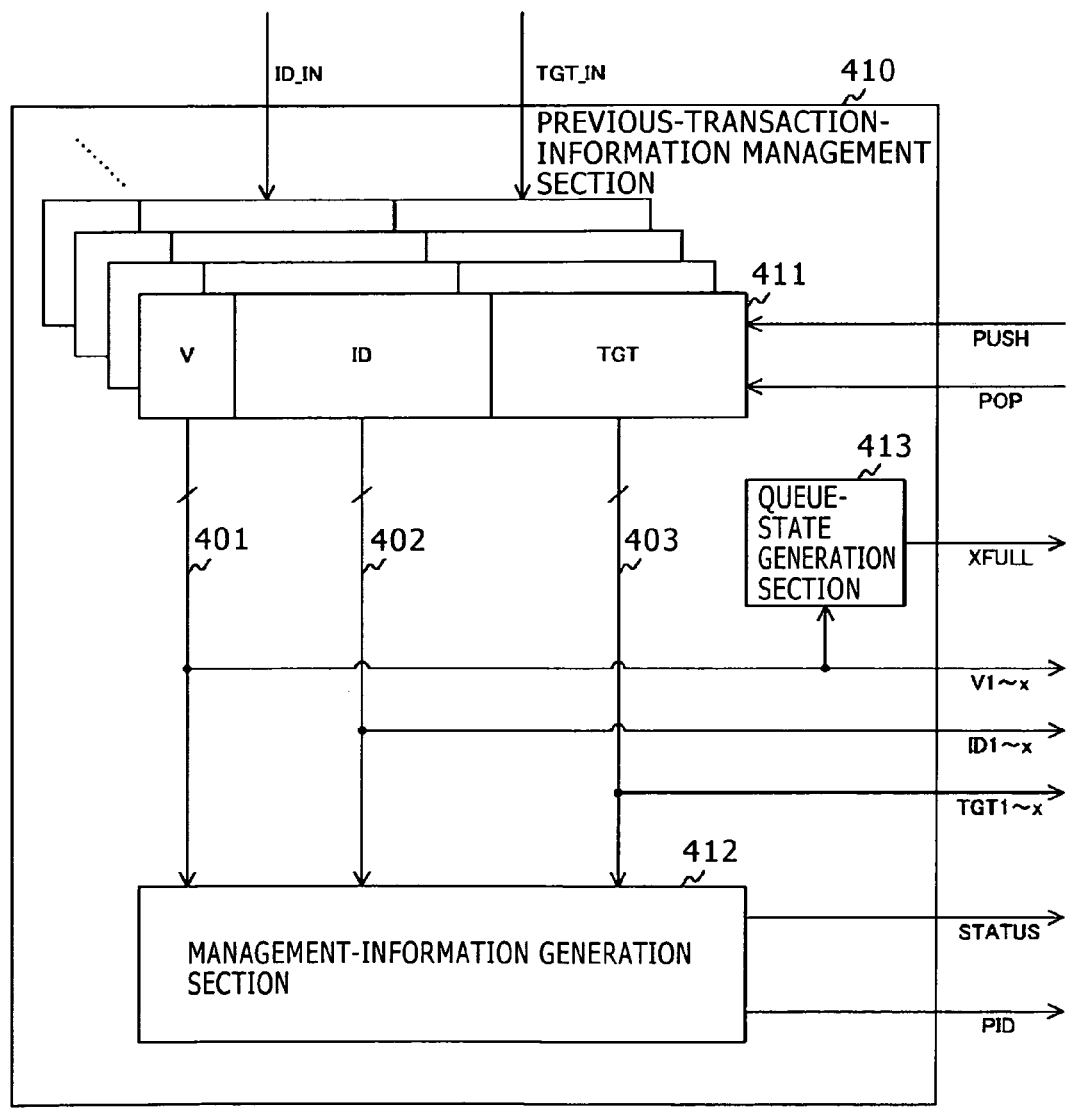
FIG. 9 is a block diagram showing a typical configuration of a previous-transaction-information management section employed in the deadlock avoidance circuit to serve as a section according to the first embodiment of the present disclosure.

FIG. 9 is a block diagram showing a typical configuration of the previous-transaction-information management section 410 according to the first embodiment of the present disclosure. As shown in the figure, the previous-transaction-information management section 410 employs the information-management queue 411 cited above, a management-information generation section 412 and a queue-state generation section 413.

The information-management queue 411 is a queue used for holding pieces of previous-transaction information by adoption of the so-called FIFO (First-In First-Out) technique. Each piece of previous-transaction information includes a pair consisting of the identifier ID of a transaction and a target-slave number TGT which is a number assigned to a slave 200 serving as a target of the transaction. Each piece of previous-transaction information is held in an entry of the information-management queue 411. In addition, every entry is also used for holding a validity signal V indicating the validity of the previous-transaction information held in the entry. The information-management queue 411 can be used for holding x pieces of previous-transaction information where symbol x is an integer. A validity signal V, an identifier ID and a target-slave number TGT which are held in an entry can be retrieved from the entry through signal lines 401, 402 and 403 respectively.

A new entry, which is a pair of ID_IN and TGT_IN, is added to the information-management queue 411 when the PUSH signal output by the logical-product gate 452 is activated. On the other hand, the earliest entry is deleted from the information-management queue 411 in accordance with the FIFO technique when the POP signal output by the logical-product gate 491 is activated.

It is to be noted that, as the AXI protocol on the slave side, only the order of transactions having different identifiers can be changed in a reordering process. Thus, it is possible to manage transactions each having a target-slave number TGT as is the case with this embodiment of the present disclosure.

The management-information generation section 412 is a section for generating information on previous-transaction information held in the information-management queue 411. That is to say, the management-information generation section 412 generates STATUS and PID signals representing information on accesses made by the master 100 associated with the deadlock avoidance circuit 400 as accesses to a plurality of different slaves 200. As described earlier, the PID signal is an identifier assigned to each of transactions entailing accesses to a plurality of different slaves 200 whereas the STATUS signal is the number of accesses associated with the PID signal.

The queue-state generation section 413 is a section for generating information on the state of the information-management queue 411. To put it concretely, the queue-state generation section 413 generates an XFULL signal indicating that the information-management queue 411 employed in the previous-transaction-information management section 410 is not full yet.

Figure 10:
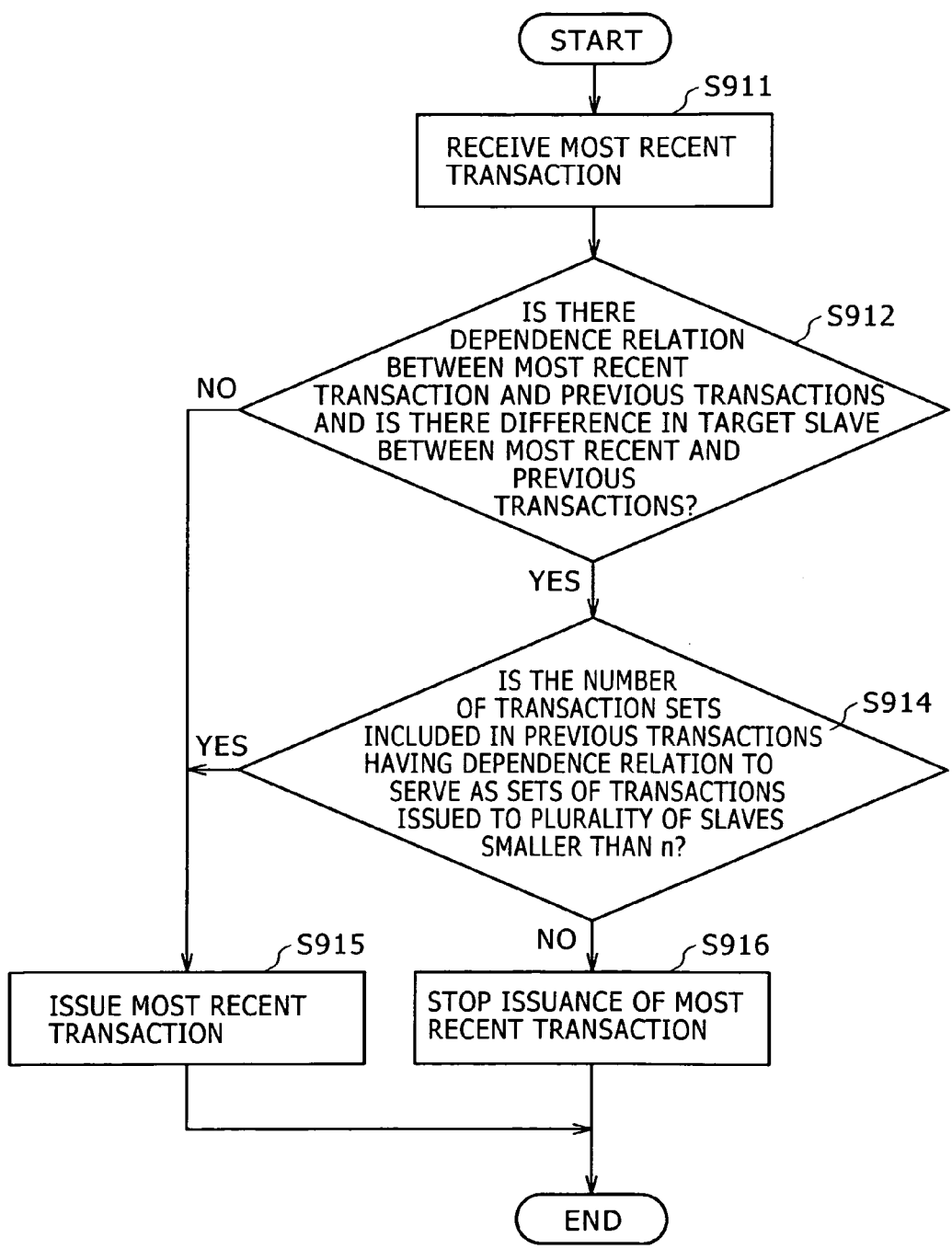
FIG. 10 shows a flowchart representing typical transaction-action determination processing carried out by a transaction-issuance-termination determination section employed in the deadlock avoidance circuit to serve as a section according to the first embodiment of the present disclosure.

FIG. 10 shows a flowchart representing typical transaction-action determination processing carried out by the transaction-issuance-termination determination section 420 according to the first embodiment of the present disclosure. As shown in the figure, the flowchart begins with a step S911 at which a most recent transaction is received from the master 100. When the most recent transaction is received from the master 100, the transaction-issuance-termination determination section 420 determines whether or not the most recent transaction can be passed on to a slave 200 as follows.

First of all, at the following step S912, the transaction-issuance-termination determination section 420 determines whether or not there is a dependence relation between the most recent transaction and previous transactions and whether or not the most recent transaction has a target slave different from those of the previous transactions. If there is no dependence relation between the most recent transaction and previous transactions, it is not necessary to take a deadlock into consideration. Thus, in this case, the flow of the transaction-action determination processing goes on to a step S915 at which the most recent transaction is passed on to a slave 200. Even if there is a dependence relation between the most recent transaction and previous transactions, the target slave 200 of the most recent transaction may match those of the previous transactions. In this case, overtaking does not occur as long as the target slave 200 sustains the order. Thus, the flow of the transaction-action determination processing also goes on to the step S915.

If there is a dependence relation between the most recent transaction and previous transactions and the most recent transaction has a target slave different from those of the previous transactions, on the other hand, the flow of the transaction-action determination processing goes on to a step S914.

The previous transactions for which a dependence relation exists include sets of specific transactions issued to different target slaves 200. At the step S914, the transaction-issuance-termination determination section 420 counts the number of such specific-transaction sets and determines whether or not the number of such specific-transaction sets is smaller than an integer n which is the number of stages composing the response saving buffer 470. If the number of such specific transactions is smaller than the integer n, the specific transactions can be saved in the response saving buffer 470. Thus, in this case, the flow of the transaction-action determination processing also goes on to the step S915. If the number of such specific transactions is not smaller than the integer n, on the other hand, the flow of the transaction-action determination processing goes on to a step S916 at which the issuance of the most recent transaction is stopped.

Figure 11:
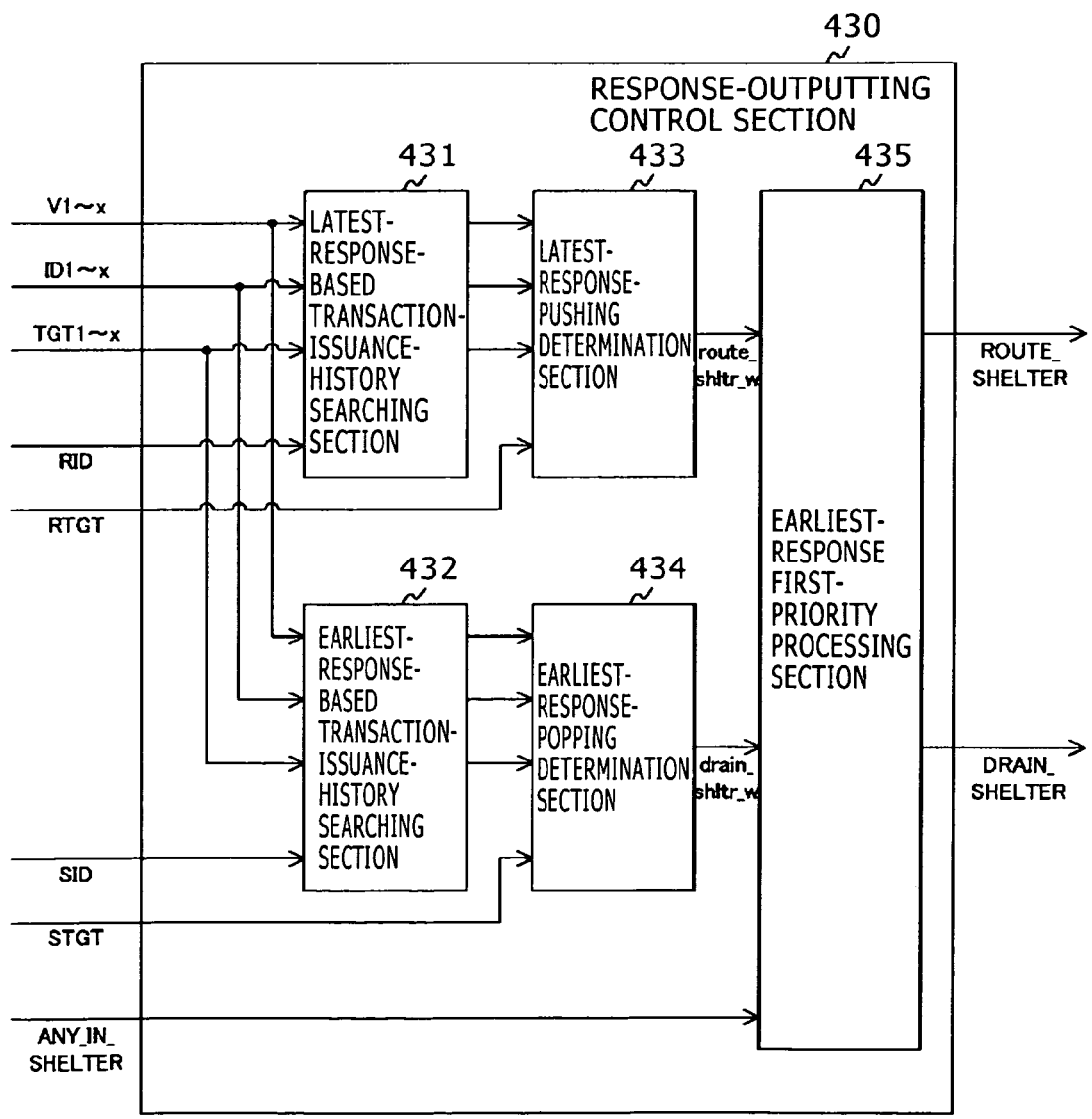
FIG. 11 is a block diagram showing a typical configuration of a response-outputting control section employed in the deadlock avoidance circuit to serve as a section according to the first embodiment of the present disclosure.

FIG. 11 is a block diagram showing a typical configuration of the response-outputting control section 430 according to the first embodiment of the present disclosure. As shown in the figure, the response-outputting control section 430 employs a latest-response-based transaction-issuance-history searching section 431 and a latest-response-pushing determination section 433. In addition, the response-outputting control section 430 also has an earliest-response-based transaction-issuance-history searching section 432, an earliest-response-popping determination section 434 and an earliest-response first-priority processing section 435.

The latest-response-based transaction-issuance-history searching section 431 is a section for searching the information-management queue 411 for already issued transactions each having an identifier matching the identifier of a response received from a slave 200. That is to say, the latest-response-based transaction-issuance-history searching section 431 compares the identifier RID of the response received from a slave 200 with the identifiers ID1 to IDx of all transactions held in the x entries of the information-management queue 411 in order to find transactions each having an identifier ID matching the identifier RID.

The latest-response-pushing determination section 433 is a section for determining the order to pass on a specific transaction to the master 100. That is to say, the latest-response-pushing determination section 433 determines whether or not to save a response coming from a slave 200 in the response saving buffer 470 for a specific transaction selected from transactions found in the operation, which has been carried out by the latest-response-based transaction-issuance-history searching section 431 to search the information-management queue 411, as the transactions each having an identifier ID matching the identifier RID. The specific transaction is a transaction having a target-slave number matching the target-slave number of the response received from slave 200. That is to say, the latest-response-pushing determination section 433 compares the target-slave number TGT403 of each transaction found in the search operation with the target-slave number RTGT of the response received from slave 200 in order to find a transaction having a the target-slave number TGT403 matching the target-slave number RTGT. Then, if the found transaction is not the least recent one, the latest-response-pushing determination section 433 activates a route_shltr_w signal and supplies this signal to the earliest-response first-priority processing section 435. The route_shltr_w signal is a signal requesting that the response coming from a slave 200 be saved in the response saving buffer 470.

The earliest-response-based transaction-issuance-history searching section 432 is a section for searching the information-management queue 411 for already issued transactions each having an identifier matching the identifier of a response saved at the head of the response saving buffer 470. That is to say, the earliest-response-based transaction-issuance-history searching section 432 compares the identifier SID of the response saved at the head of the response saving buffer 470 with the identifiers ID1 to IDx of all transactions held in the x entries of the information-management queue 411 in order to find transactions each having an identifier ID matching the identifier SID.

The earliest-response-popping determination section 434 is a section for determining the order to pass on a particular transaction to the master 100. That is to say, the earliest-response-popping determination section 434 determines whether or not to pass on a response saved in the response saving buffer 470 to the master 100 for a particular transaction selected from transactions found in the operation, which has been carried out by the earliest-response-based transaction-issuance-history searching section 432 to search the information-management queue 411, as the transactions each having an identifier ID matching the identifier SID. The particular transaction is a transaction having a target-slave number matching the target-slave number of the response saved at the head of the response saving buffer 470. That is to say, the earliest-response-popping determination section 434 compares the target-slave number TGT403 of each transaction found in the search operation with the target-slave number STGT of the response saved at the head of the response saving buffer 470 in order to find a transaction having a the target-slave number TGT403 matching the target-slave number STGT. Then, if the found transaction is the least recent one, the earliest-response-popping determination section 434 activates a drain_shltr_w signal and supplies this signal to the earliest-response first-priority processing section 435. The drain_shltr_w signal is a signal requesting that the response saved at the head of the response saving buffer 470 be passed on to the master 100.

If a response saved at the head of the response saving buffer 470 can be passed on to the master 100, the earliest-response first-priority processing section 435 carries out control to process the response preferentially. Thus, if a response saved at the head of the response saving buffer 470 can be passed on to the master 100, the earliest-response first-priority processing section 435 gives the highest priority to the processing to pass on the response to the master 100, allowing the processing of the response to take precedence over processing to be carried on a most recent response newly coming from a slave 200. That is to say, a command DRAIN_SHELTER to fetch a response from the head of the response saving buffer 470 is expressed as follows:

DRAIN_SHELTER=drain_shltr_w & ANY_IN_SHELTER

In the above expression, symbol ANY_IN_SHELTER denotes an ANY_IN_SHELTER signal which is activated when at least one response has been saved in the response saving buffer 470. On the other hand, a command ROUTE_SHELTER to save a response in the response saving buffer 470 is expressed as follows:

ROUTE_SHELTER=NOT (DRAIN_SHELTER) & route_shltr_w

As described above, in accordance with the first embodiment of the present disclosure, the deadlock avoidance circuit 400 includes a response saving buffer 470 serving as a memory used for storing responses in case the responses are received in an order different from the expected order. Thus, it is possible to tolerate transactions which have a dependence relation and are issued to different slaves 200. In this case, the maximum number of responses that can be saved in the response saving buffer 470 is an integer n. Thus, if the number of responses saved in the response saving buffer 470 is about to exceed the integer n, the transaction-issuance-termination determination section 420 stops an operation to issue a transaction to a slave 200.

2: Second Embodiment

Next, a second embodiment of the present disclosure is explained as follows. In the case of the first embodiment of the present disclosure, it is assumed that the response saving buffer 470 is used. In the case of the second embodiment of the present disclosure, on the other hand, the response saving buffer 470 is not used. If a response is received from a slave 200 in an order different from the expected order, the response is discarded and a retry is carried out to reissue a transaction for the discarded response to the slave 200. It is to be noted that the overall configuration of the bus system in the second embodiment is identical with that explained earlier by referring to FIG. 1.

Configuration of the Deadlock Avoidance Circuit

Figure 12:
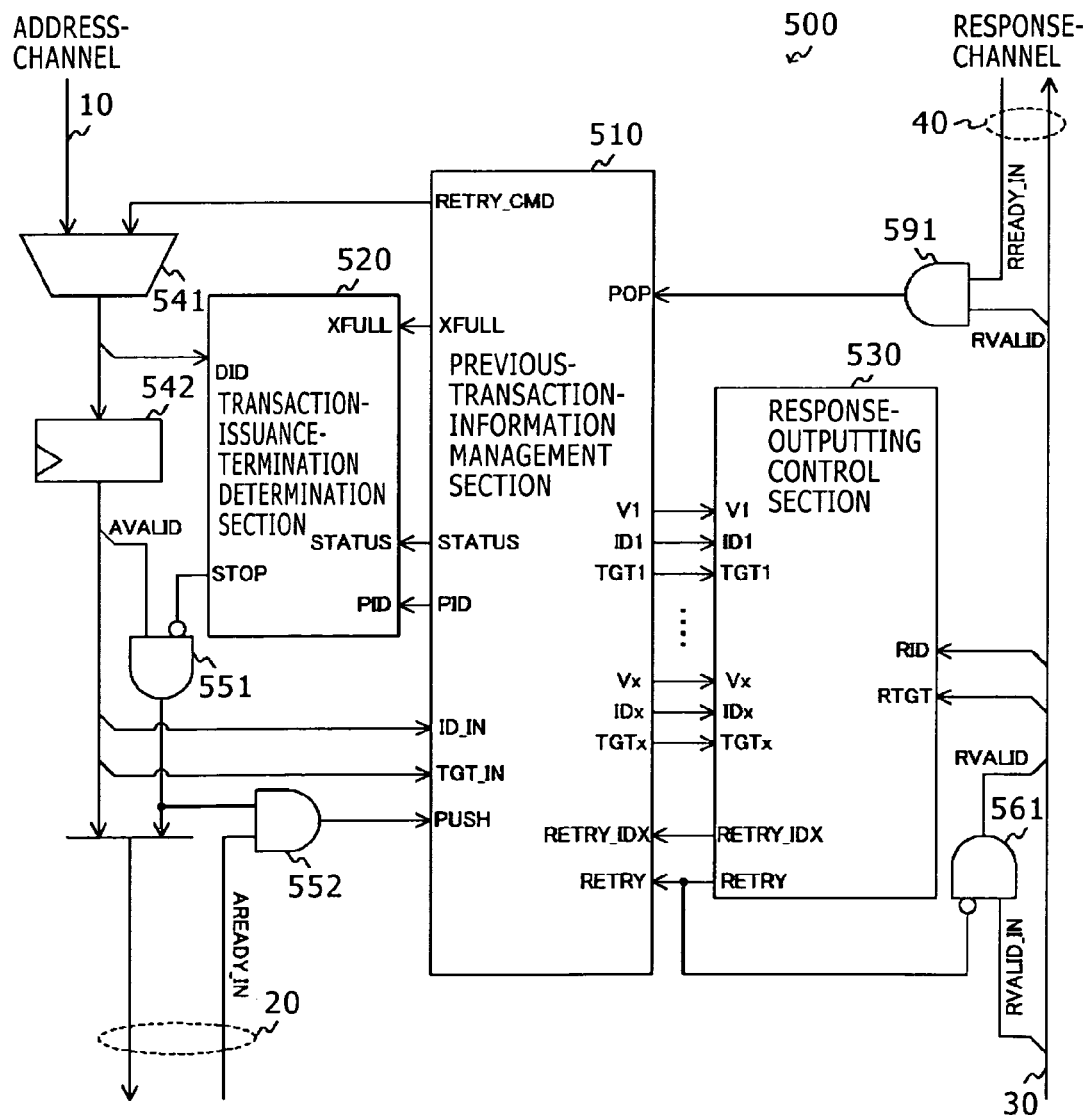
FIG. 12 is a block diagram showing a typical configuration of a deadlock avoidance circuit according to a second embodiment of the present disclosure.

FIG. 12 is a block diagram showing a typical configuration of a deadlock avoidance circuit 500 according to the second embodiment of the present disclosure. As shown in the figure, the deadlock avoidance circuit 500 employs a previous-transaction-information management section 510, a transaction-issuance-termination determination section 520, a response-outputting control section 530, a selector 541, a latch 542 as well as logical-product gates 551, 552, 561 and 591.

The previous-transaction-information management section 510 is a section for managing information on previous transactions issued previously by the master 100 associated with the deadlock avoidance circuit 500 to any of a plurality of slaves 200 in the same way as the previous-transaction-information management section 410. Much like the previous-transaction-information management section 410, the previous-transaction-information management section 510 has an information-management queue 511 for holding previous-transaction information. The previous-transaction-information management section 510 supplies the previous-transaction information to the transaction-issuance-termination determination section 520 and the response-outputting control section 530 in the same way as the previous-transaction-information management section 410. However, the previous-transaction-information management section 510 is different from the previous-transaction-information management section 410 in that, in the case of the previous-transaction-information management section 510, at a RETRY request made by the response-outputting control section 530, the previous-transaction-information management section 510 issues a RETRY_CMD command for a transaction specified by a RETRY_IDX signal in the information-management queue 511.

On the basis of the previous-transaction information managed by the previous-transaction-information management section 510, the transaction-issuance-termination determination section 520 determines whether or not a most recent transaction newly issued by the master 100 associated with the deadlock avoidance circuit 500 is a cause of a deadlock in the same way as the transaction-issuance-termination determination section 420. If the transaction-issuance-termination determination section 520 determines that the most recent transaction newly issued by the master 100 associated with the deadlock avoidance circuit 500 is a cause of a deadlock, the transaction-issuance-termination determination section 520 stops an operation to pass on the most recent transaction to a slave 200. To be more specific, if the transaction-issuance-termination determination section 520 determines that the most recent transaction newly issued by the master 100 associated with the deadlock avoidance circuit 500 is a cause of a deadlock, the transaction-issuance-termination determination section 520 stops an operation to pass on the most recent transaction to a slave 200 by activating a STOP signal output to the logical-product gate 551. In the case of the second embodiment, however, it is assumed that the response saving buffer 470 is not used. Thus, the number of stages in the response saving buffer 470 is not taken into consideration.

The response-outputting control section 530 is a section for controlling responses to be passed on to the master 100 associated with the deadlock avoidance circuit 500 on the basis of the previous-transaction information managed by the previous-transaction-information management section 510 in the same way as the response-outputting control section 430. In the case of the second embodiment, however, it is assumed that the response saving buffer 470 is not used. Thus, the response-outputting control section 530 controls only responses received from slaves 200.

The selector 541 is a select section for selecting a most recent transaction newly received from the master 100 associated with the address channel or a transaction involved in a retry requested by the RETRY_CMD command received from the previous-transaction-information management section 510. The latch 542 is a latch used for holding the signal of a transaction selected by the selector 541. The logical-product gate 551 is a gate for masking the AVALID signal latched in the latch 542 in accordance with the STOP signal output by the transaction-issuance-termination determination section 520 in the same way as the logical-product gate 451. The logical-product gate 552 is a gate for producing the logical product of an AREADY (AREADY_IN) signal coming from a slave 200 and a signal output by the logical-product gate 551 in the same way as the logical-product gate 452. The logical-product gate 561 is a gate for masking an RVALID (RVALID_IN) signal, which is supplied by a slave 200 through a response channel 30, when the response-outputting control section 530 is making a request for a retry. If the signal output by the logical-product gate 561 is active, the response supplied by the slave 200 is discarded. The logical-product gate 591 is a gate for producing the logical product of an RREADY (RREADY_IN) signal coming from the master 100 and the RVALID signal output by a slave 200 in the same way as the logical-product gate 491. If the signal output by the logical-product gate 591 is active, a transaction held in the information-management queue 511 employed in the previous-transaction-information management section 510 is released.

Figure 13:
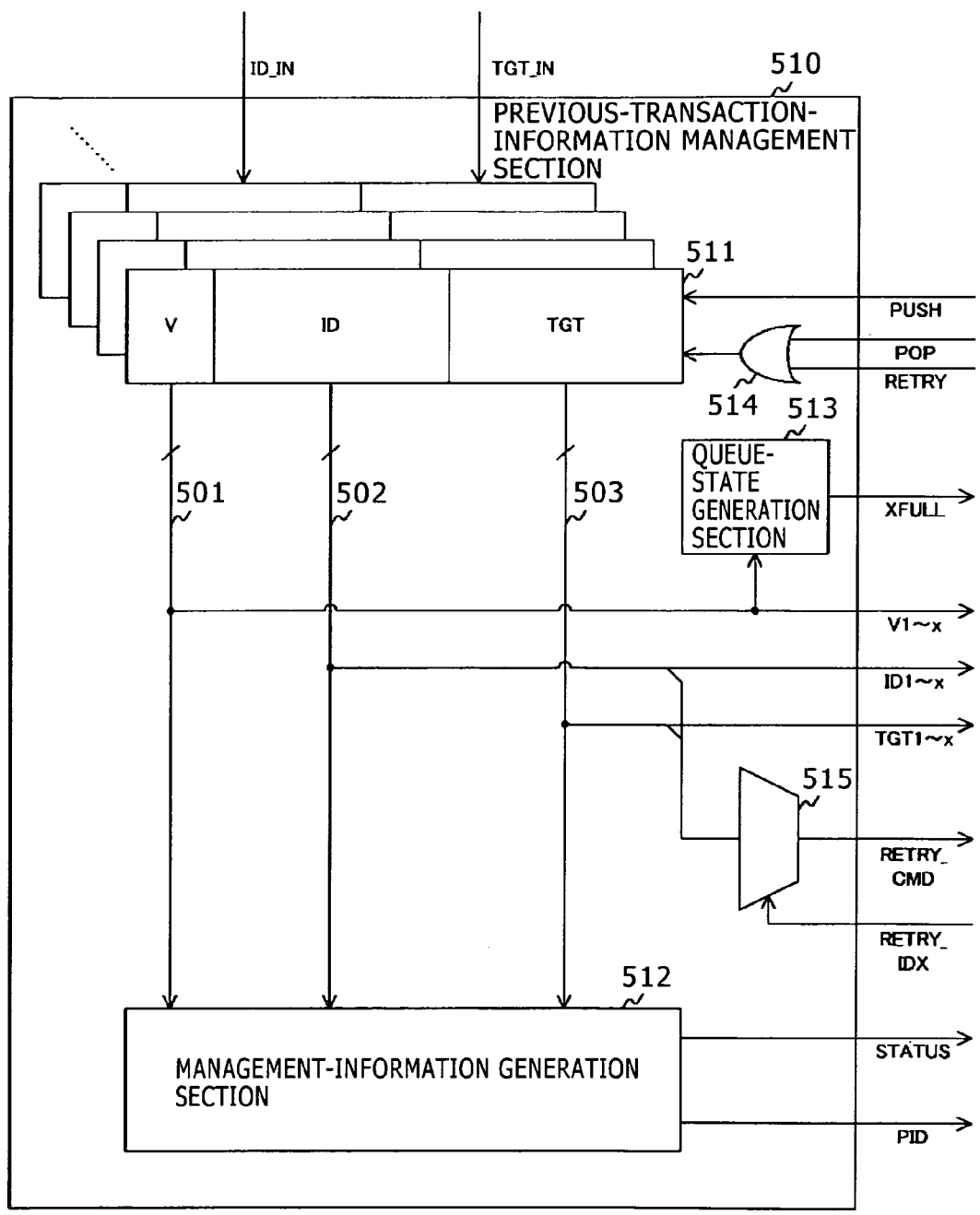
FIG. 13 is a block diagram showing a typical configuration of a previous-transaction-information management section employed in the deadlock avoidance circuit to serve as a section according to the second embodiment of the present disclosure.

FIG. 13 is a block diagram showing a typical configuration of the previous-transaction-information management section 510 according to the second embodiment of the present disclosure. As shown in the figure, the previous-transaction-information management section 510 employs the information-management queue 511 cited above, a management-information generation section 512, a queue-state generation section 513, a logical-sum gate 514 and a selector 515.

Much like the information-management queue 411, the information-management queue 511 is a queue used for holding pieces of previous-transaction information by adoption of the FIFO (First-In First-Out) technique. Much like the management-information generation section 412, the management-information generation section 512 is a section for generating information on previous-transaction information held in the information-management queue 511. That is to say, the management-information generation section 512 generates STATUS and PID signals representing information on accesses made by the master 100 associated with the deadlock avoidance circuit 500 as accesses to a plurality of different slaves 200 in the same way as the management-information generation section 412. Much like the queue-state generation section 413, the queue-state generation section 513 is a section for generating information on the state of the information-management queue 511. To put it concretely, the queue-state generation section 513 generates an XFULL signal indicating that the information-management queue 511 employed in the previous-transaction-information management section 510 is not full yet in the same way as the queue-state generation section 413.

The logical-sum gate 514 is a gate for producing the logical sum of POP and RETRY signals. A signal output by the logical-sum gate 514 is used as a pop signal for retrieving previous-transaction information from the head of the information-management queue 511. That is to say, in the case of the first embodiment, the signal output by the logical-product gate 491 is used as a pop signal as it is but, in the case of the second embodiment, on the other hand, this information popping operation is carried out also when the RETRY signal generated by the response-outputting control section 530 is active.

The selector 515 is a section for selecting an entry specified by a RETRY_IDX signal from entries of the information-management queue 511. The signal output by the selector 515 is supplied to one of input terminals of the selector 541 as a RETRY_CMD command. Thus, a retry operation can be carried out for a transaction held in any arbitrary entry of the information-management queue 511.

Figure 14:
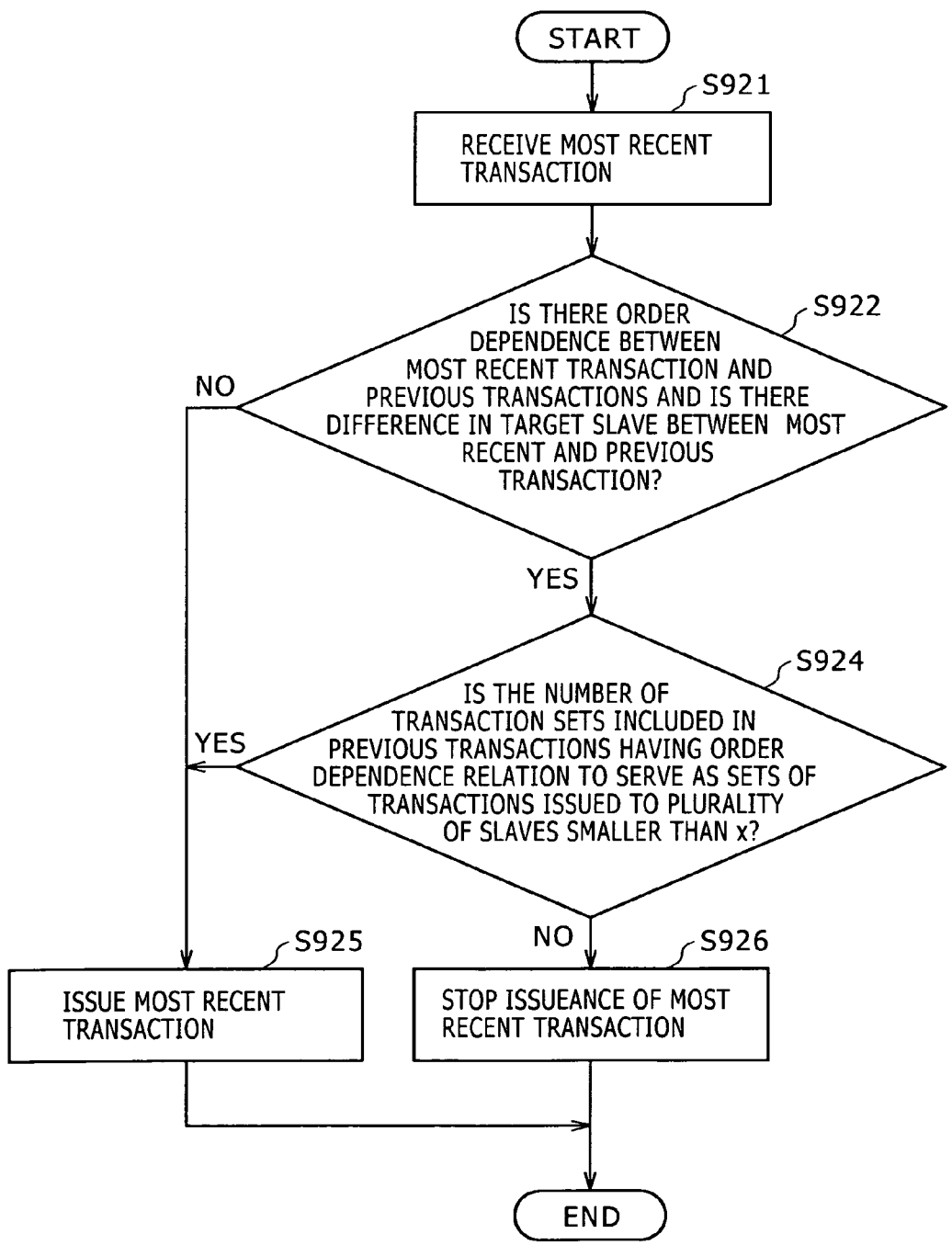
FIG. 14 shows a flowchart representing typical transaction-action determination processing carried out by a transaction-issuance-termination determination section employed in the deadlock avoidance circuit to serve as a section according to the second embodiment of the present disclosure.

FIG. 14 shows a flowchart representing typical transaction-action determination processing carried out by the transaction-issuance-termination determination section 520 according to the second embodiment of the present disclosure. The flowchart representing the typical transaction-action determination processing carried out by the transaction-issuance-termination determination section 520 according to the second embodiment of the present disclosure is similar to the flowchart representing the typical transaction-action determination processing carried out by the transaction-issuance-termination determination section 520 according to the second embodiment of the present disclosure as explained earlier by referring to FIG. 10. Steps S921 to S926 of the flowchart shown in FIG. 14 correspond to respectively the steps S911 to S916 of the flowchart shown in FIG. 10. It is to be noted, however, as is obvious from the step S914, the first embodiment tolerates up to n sets of previous transactions having a dependence relation and propagating to different target slaves 200 where symbol n is the number of stages composing the response saving buffer 470. As is obvious from the step S924, on the other hand, the second embodiment tolerates up to x sets of previous transactions having an order dependence relation and propagating to different target slaves 200 where symbol x is the number of entries composing the information-management queue 511. This is because, if the number of sets of previous transactions having an order dependence relation and propagating to different target slaves 200 exceeds x, the previous transactions can no longer be controlled by the previous-transaction-information management section 510.

Figure 15:
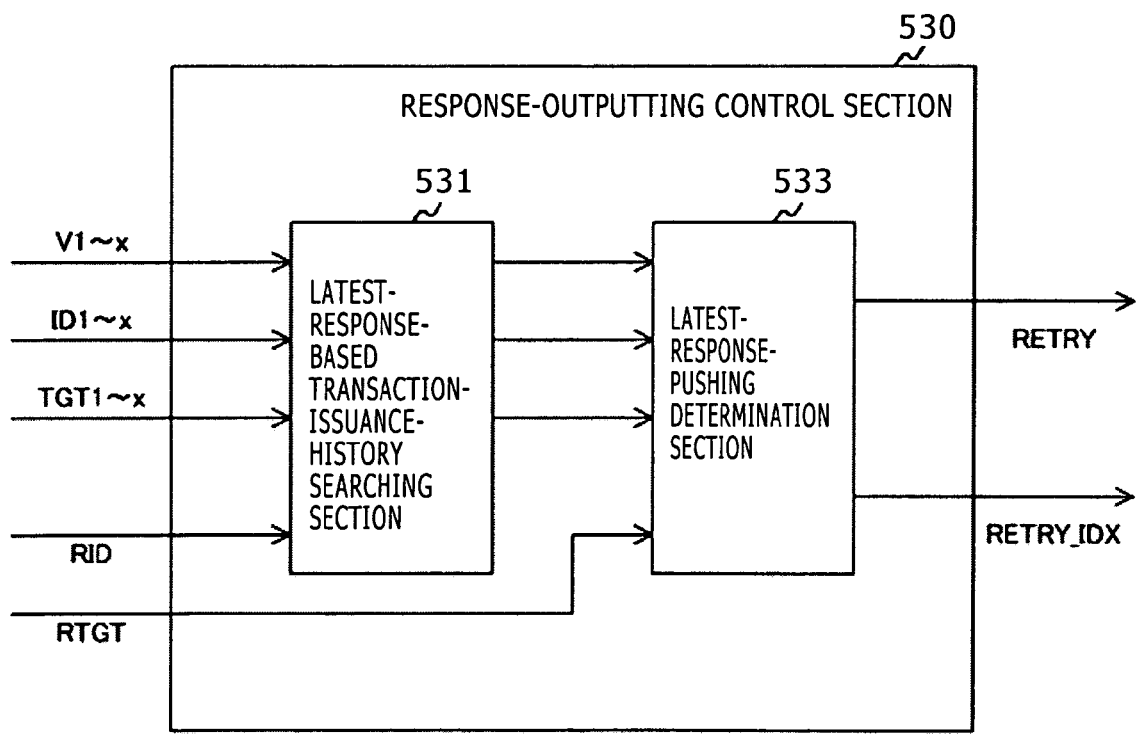
FIG. 15 is a block diagram showing a typical configuration of a response-outputting control section employed in the deadlock avoidance circuit to serve as a section according to the second embodiment of the present disclosure.

FIG. 15 is a block diagram showing a typical configuration of the response-outputting control section 530 according to the second embodiment of the present disclosure. As shown in the figure, the response-outputting control section 530 employs a latest-response-based transaction-issuance-history searching section 531 and a latest-response-pushing determination section 533.

Much like the latest-response-based transaction-issuance-history searching section 431, the latest-response-based transaction-issuance-history searching section 531 is a section for searching the information-management queue 511 for already issued transactions each having an identifier matching the identifier of a response received from a slave 200.

The latest-response-pushing determination section 533 is a section for determining the order to pass on a specific transaction to the master 100. That is to say, the latest-response-pushing determination section 533 determines whether or not to discard a response coming from a slave 200 for a specific transaction selected in the same way as the latest-response-pushing determination section 433 from transactions found in the operation, which has been carried out by the latest-response-based transaction-issuance-history searching section 531 to search the information-management queue 511, as the transactions each having an identifier matching the identifier of the response received from the slave 200. The specific transaction is a transaction having a target-slave number matching the target-slave number of the response received from slave 200. That is to say, if the specific transaction having a target-slave number matching the target-slave number of the response received from slave 200 is not the least recent transaction, the latest-response-pushing determination section 533 outputs a RETRY_IDX signal for conveying the entry number of the specific transaction and a RETRY signal for making request for a retry of another response for the transaction.

As described above, in accordance with the second embodiment of the present disclosure, if a response is received from a slave 200 in an order different from the expected order, the response is discarded in order to surely pass on responses received from slaves 200 to the master 100 in the expected order. In this case, a retry is carried out for a transaction corresponding to the discarded response by transmitting a request for the retry to the slave 200 to request the slave 200 to send another response. Since the second embodiment does not include the response saving buffer 470 employed in the first embodiment, the circuit of the second embodiment becomes simple in comparison with the first one.

3: Third Embodiment

Next, a third embodiment of the present disclosure is explained as follows. In the case of the first embodiment of the present disclosure, it is assumed that the response saving buffer 470 is used in the deadlock avoidance circuit 400 whereas, in the case of the third embodiment of the present disclosure, each slave 200 is used to function also as a response saving buffer. It is to be noted that the overall configuration of the bus system in the third embodiment is identical with that explained earlier by referring to FIG. 1.

Configuration of the Deadlock Avoidance Circuit

Figure 16:
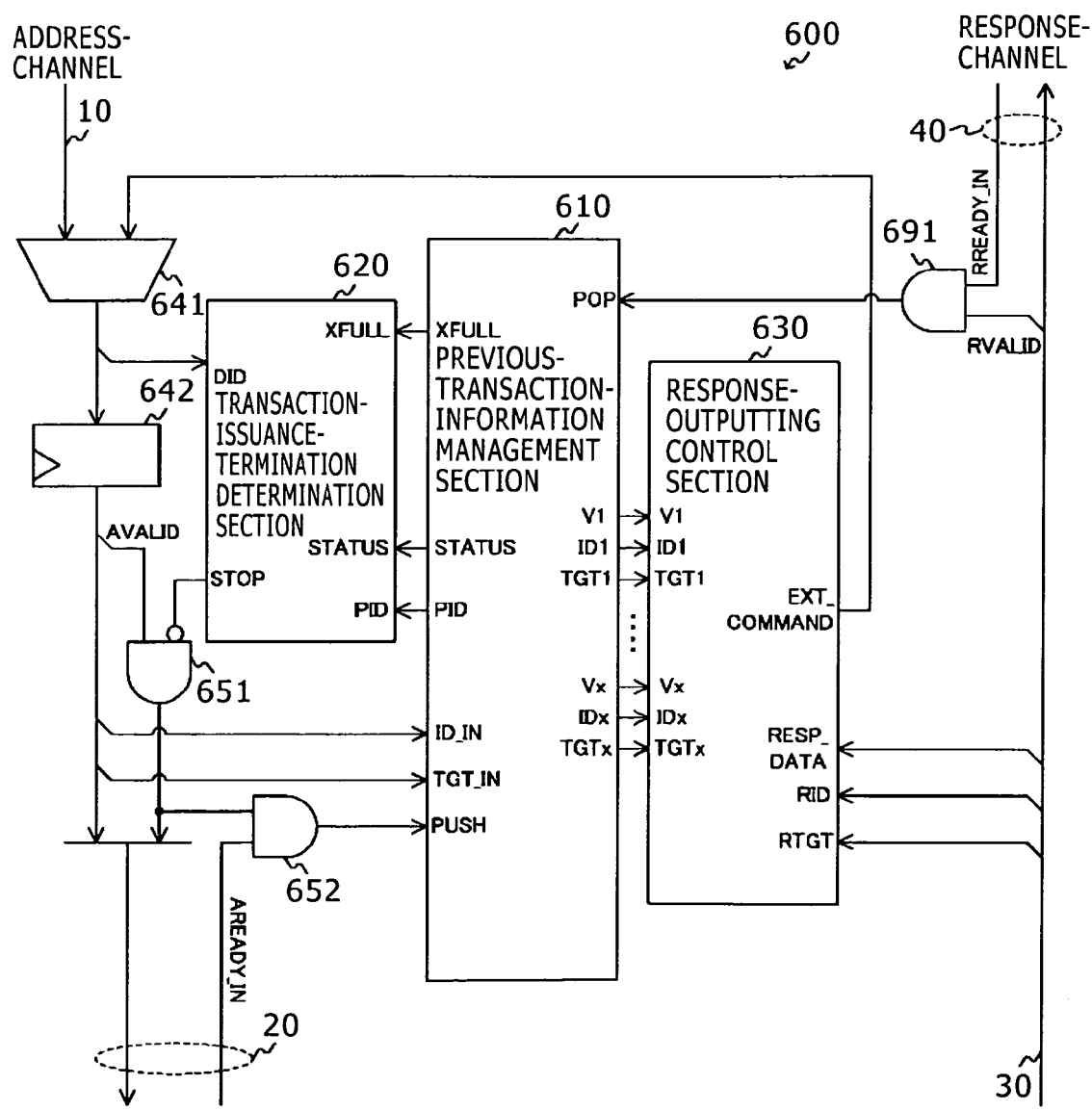
FIG. 16 is a block diagram showing a typical configuration of a deadlock avoidance circuit according to a third embodiment of the present disclosure.

FIG. 16 is a block diagram showing a typical configuration of a deadlock avoidance circuit 600 according to the third embodiment of the present disclosure. As shown in the figure, the deadlock avoidance circuit 600 employs a previous-transaction-information management section 610, a transaction-issuance-termination determination section 620, a response-outputting control section 630, a selector 641, a latch 642 as well as logical-product gates 651, 652 and 691.

The previous-transaction-information management section 610 is a section for managing information on previous transactions issued previously by the master 100 associated with the deadlock avoidance circuit 600 to any of a plurality of slaves 200 in the same way as the previous-transaction-information management section 410. Much like the previous-transaction-information management section 410, the previous-transaction-information management section 610 has an information-management queue 611 for holding the previous-transaction information. The previous-transaction-information management section 610 supplies the previous-transaction information to the transaction-issuance-termination determination section 620 and the response-outputting control section 630 in the same way as the previous-transaction-information management section 410.

On the basis of the previous-transaction information managed by the previous-transaction-information management section 610, the transaction-issuance-termination determination section 620 determines whether or not a most recent transaction newly issued by the master 100 associated with the deadlock avoidance circuit 600 is a cause of a deadlock in the same way as the transaction-issuance-termination determination section 420. If the transaction-issuance-termination determination section 620 determines that the most recent transaction newly issued by the master 100 associated with the deadlock avoidance circuit 600 is a cause of a deadlock, the transaction-issuance-termination determination section 620 stops an operation to pass on the most recent transaction to a slave 200. To put it in detail, if the transaction-issuance-termination determination section 620 determines that the most recent transaction newly issued by the master 100 associated with the deadlock avoidance circuit 600 is a cause of a deadlock, the transaction-issuance-termination determination section 620 stops an operation to pass on the most recent transaction to a slave 200 by activating a STOP signal output to the logical-product gate 651.

The response-outputting control section 630 is a section for controlling responses to be passed on to the master 100 associated with the deadlock avoidance circuit 600 on the basis of the previous-transaction information managed by the previous-transaction-information management section 610 in the same way as the response-outputting control section 430. In the case of the third embodiment, however, it is assumed that each slave 200 is also used as a response saving buffer. Thus, the response-outputting control section 630 controls a response to be saved in such a buffer as a command given to a slave 200.

The selector 641 is a select section for selecting a most recent transaction newly received from the master 100 associated with the address channel or a transaction related to an external command received from the response-outputting control section 630. The latch 642 is used for holding the signal of a transaction selected by the selector 641. The logical-product gate 651 is a gate for masking the AVALID signal latched in the latch 642 in accordance with the STOP signal output by the transaction-issuance-termination determination section 620 in the same way as the logical-product gate 451. The logical-product gate 652 is a gate for producing the logical product of an AREADY (AREADY_IN) signal coming from a slave 200 and a signal output by the logical-product gate 651 in the same way as the logical-product gate 452. The logical-product gate 691 is a gate for producing the logical product of an RREADY (RREADY_IN) signal coming from the master 100 and the RVALID signal output by a slave 200 in the same way as the logical-product gate 491. If the signal output by the logical-product gate 691 is active, a transaction held in the information management queue 611 employed in the previous-transaction-information management section 610 is released.

Figure 17:
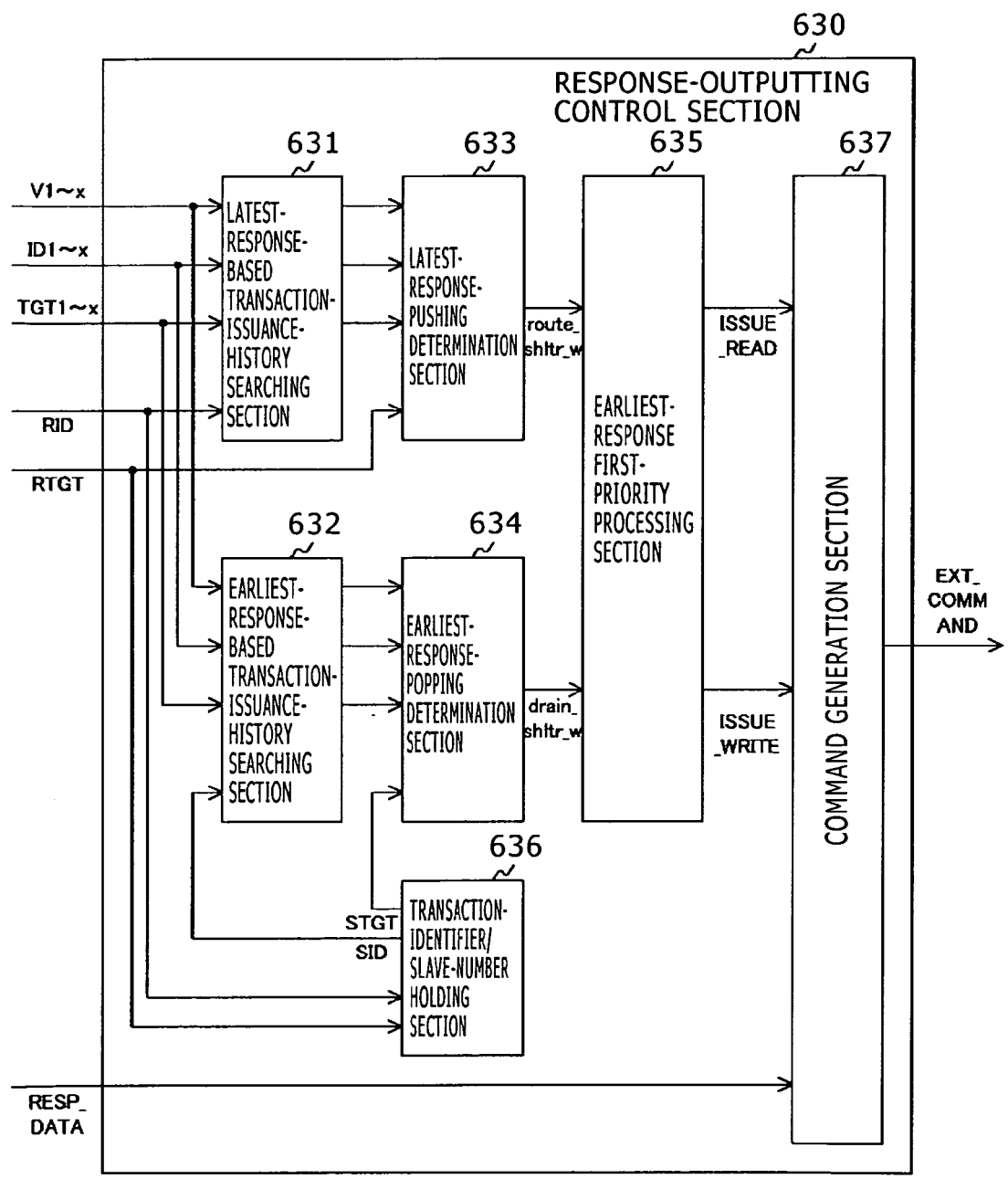
FIG. 17 is a block diagram showing a typical configuration of a response-outputting control section employed in the deadlock avoidance circuit to serve as a section according to the third embodiment of the present disclosure.

FIG. 17 is a block diagram showing a typical configuration of the response-outputting control section 630 according to the third embodiment of the present disclosure. The response-outputting control section 630 has a configuration similar to the configuration of the response-outputting control section 430. In the case of the third embodiment, however, the response saving buffer is provided in the slave 200. Thus, in order to simulate the response saving buffer, the response-outputting control section 630 is further provided with a transaction-identifier/slave-number holding section 636 and a command generation section 637. In addition, the response-outputting control section 630 employs an earliest-response first-priority processing section 635 in place of the earliest-response first-priority processing section 435.

The transaction-identifier/slave-number holding section 636 is a section for holding saved data received from a slave 200. To put it concretely, the transaction-identifier/slave-number holding section 636 holds the identifier RID of a transaction related to a response received from a target slave 200 and the slave number RTGT of the target slave 200. The transaction-identifier/slave-number holding section 636 supplies the held transaction identifier RID to an earliest-response-based transaction-issuance-history searching section 632 as a saved transaction identifier SID and supplies the held transaction slave number RTGT to an earliest-response-popping determination section 634 as a saved transaction slave number STGT. That is to say, the earliest-response-based transaction-issuance-history searching section 632 receives the saved transaction identifier SID from the transaction-identifier/slave-number holding section 636 whereas the earliest-response-popping determination section 634 receives the saved transaction slave number STGT from the transaction-identifier/slave-number holding section 636.

If a response saved in the response saving buffer existing in a slave 200 can be passed on to the master 100, the earliest-response first-priority processing section 635 carries out control to process the response preferentially. Thus, if a response saved in the response saving buffer existing in a slave 200 can be passed on to the master 100, the earliest-response first-priority processing section 635 gives the highest priority to the processing to pass on the response to the master 100, allowing the processing of the response to take precedence over processing to be carried on a most recent response newly coming from a slave 200. That is to say, an operation to read out the response from the response saving buffer existing in a slave 200 is carried out by outputting an ISSUE_READ signal expressed below as a signal for fetching saved data from the buffer.

ISSUE_READ=drain_shltr_$w$ & ANY_IN_SHELTER

In the above expression, symbol ANY_IN_SHELTER denotes an ANY_IN_SHELTER signal which makes a transition to 0 when a DRAIN_SHELTER signal is set at 1 and makes a transition to 1 when a ROUTE_SHELTER signal is set at 1. In addition, an operation to write a response to be passed on to the master 100 into the response saving buffer existing in a slave 200 is carried out by outputting an ISSUE_WRITE signal expressed below as a signal for storing the response into the buffer.

ISSUE_WRITE=NOT(ISSUE_READ) & route_shltr_$w$

The command generation section 637 is a section for generating a command to make an access to the response saving buffer existing in a slave 200 on the basis of the ISSUE_READ and ISSUE_WRITE signals received from the earliest-response first-priority processing section 635. To put it in detail, when the ISSUE_READ signal is activated, the command generation section 637 generates an EXT_COMMAND command of carrying out an operation to read data saved at a specific address in the response saving buffer existing in a slave 200 in order to fetch the data. When the ISSUE_WRITE signal is activated, on the other hand, the command generation section 637 generates an EXT_COMMAND command of carrying out an operation to write a response to be passed on to the master 100 at a specific address in the response saving buffer existing in a slave 200 in order to store the response. The command generation section 637 supplies the EXT_COMMAND command to one of the input terminals of the selector 641.

As described above, in accordance with the third embodiment of the present disclosure, if a response is output from a slave 200 in an order different from the expected order, the response is saved in a response saving buffer existing in the slave 200. It is thus possible to tolerate responses which have a dependence relation and are generated by different slaves 100.

4: Fourth Embodiment

Next, a fourth embodiment of the present disclosure is explained as follows. In the case of the first to third embodiments of the present disclosure, a deadlock avoidance circuit is provided for each master 100. In the case of the fourth embodiment of the present disclosure, on the other hand, one deadlock avoidance circuit common to all masters 100 is provided to serve as a circuit shared by the masters 100. It is to be noted that the overall configuration of the bus system in the fourth embodiment is identical with that explained earlier by referring to FIG. 1.

Configuration of the Interconnect

Figure 18:
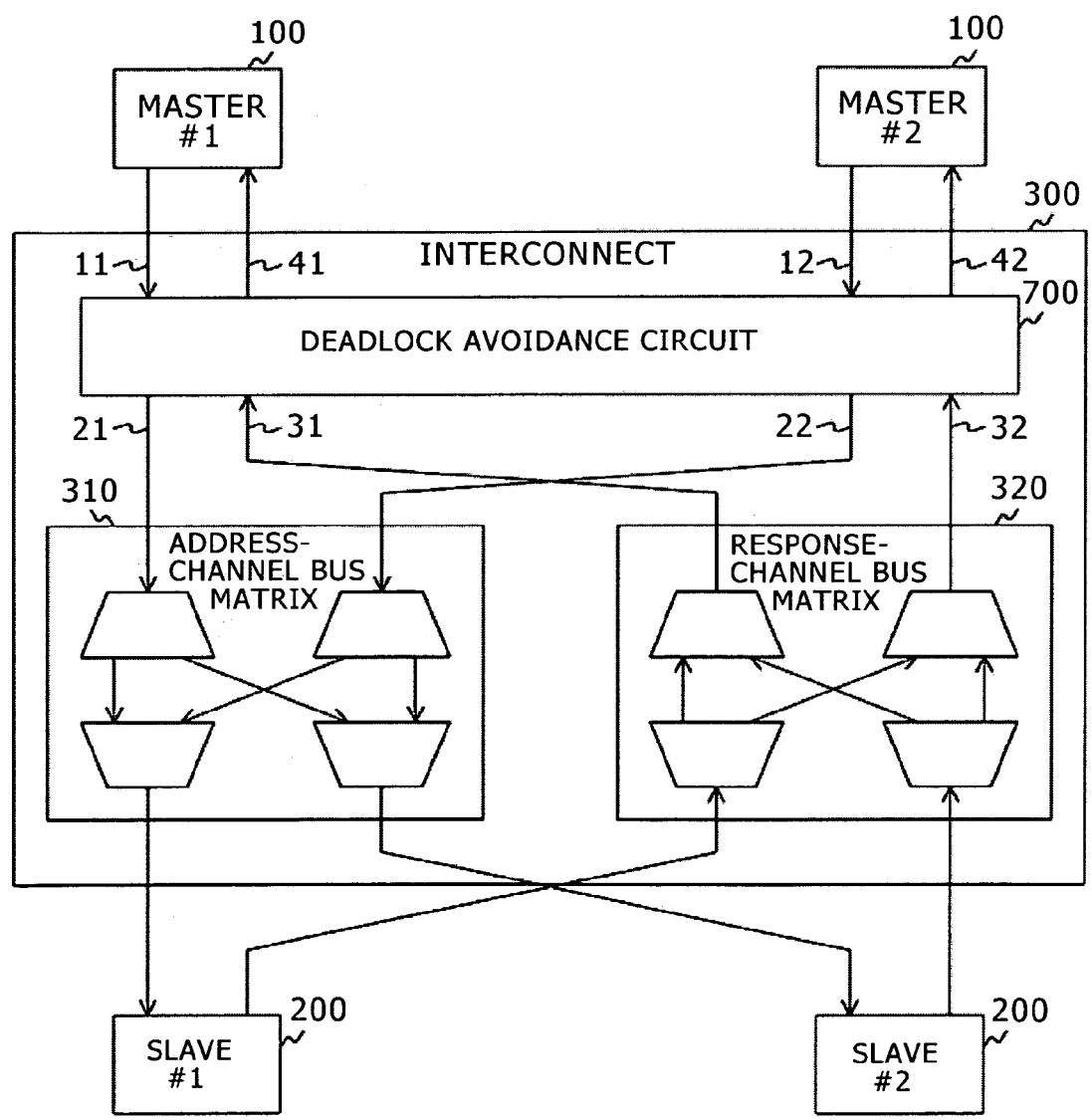
FIG. 18 is a block diagram showing a typical configuration of an interconnect according to a fourth embodiment of the present disclosure.

FIG. 18 is a block diagram showing a typical configuration of an interconnect 300 according to the fourth embodiment of the present disclosure. In the following description, it is assumed that the bus system has the interconnect 300 linked to two masters 100 and two slaves 200. It is to be noted that the fourth embodiment also adopts the AXI protocol in the same way as the first to third embodiments.

In the case of the fourth embodiment, the interconnect 300 employs one deadlock avoidance circuit 700 common to all masters 100. The deadlock avoidance circuit 700 is a circuit for controlling operations so that transactions made by the masters 100 do not cause a deadlock. For master #1 serving as the first master, the address channel is implemented by signal lines 11 and 21 whereas the response channel is implemented by signal lines 31 and 41. For master #2 serving as the second master, on the other hand, the address channel is implemented by signal lines 12 and 22 whereas the response channel is implemented by signal lines 32 and 42. The direction of an arrow representing each of the address and response channels is the same as the direction of a main signal propagating through the channel represented by the arrow. In actuality, however, if signals propagating through a channel include control signals, the control signals are generally exchanged in both directions.

Configuration of the Deadlock Avoidance Circuit

Figure 19:
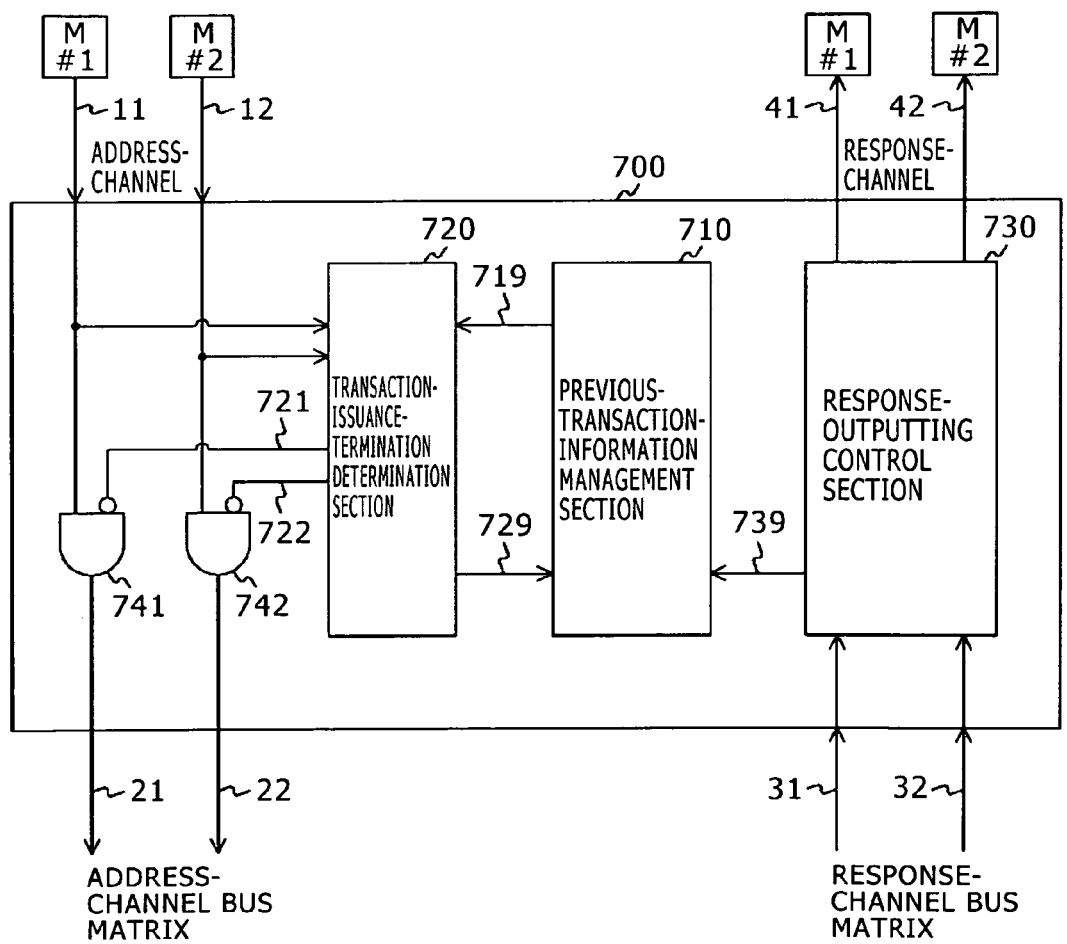
FIG. 19 is a block diagram showing a typical configuration of a deadlock avoidance circuit employed in the interconnect to serve as a circuit according to the fourth embodiment of the present disclosure.

FIG. 19 is a block diagram showing a typical configuration of the deadlock avoidance circuit 700 according to the fourth embodiment of the present disclosure. As shown in the figure, the deadlock avoidance circuit 700 employs a previous-transaction-information management section 710, a transaction-issuance-termination determination section 720, a response-outputting control section 730 as well as logical-product gates 741 and 742.

The previous-transaction-information management section 710 is a section for managing information on previous transactions issued by every master 100. The previous-transaction-information management section 710 includes an information-management queue 711 provided for every master 100 to serve as a queue for holding information on previous transactions issued by the master 100. The previous-transaction-information management section 710 supplies the information on previous transactions to the transaction-issuance-termination determination section 720 through a signal line 719. In the following description, the information on previous transactions is also referred to as previous-transaction information.

On the basis of the previous-transaction information managed by the previous-transaction-information management section 710, the transaction-issuance-termination determination section 720 determines whether or not a transaction newly issued by a master 100 is a cause of a deadlock. If the transaction-issuance-termination determination section 720 determines that the transaction newly issued by the master 100 is a cause of a deadlock, the transaction-issuance-termination determination section 720 stops an operation to pass on the transaction to a slave 200. The transaction-issuance-termination determination section 720 also determines whether or not an access according to a transaction newly issued by a master 100 is in a cross-multiply relation holding true during a transfer in order to detect the possibility of a deadlock. A determination method will be described concretely later. If the transaction-issuance-termination determination section 720 determines that there is no possibility of a deadlock, the transaction-issuance-termination determination section 720 outputs information on this transaction to the previous-transaction-information management section 710 through a signal line 729 and, then, the previous-transaction-information management section 710 registers the information on the information-management queue 711 provided for the master 100 issuing the transaction.

Each of the logical-product gates 741 and 742 is a gate for masking an AVALID signal, which is propagating through the address channel, in accordance with a STOP signal output by the transaction-issuance-termination determination section 720. To put it concretely, when the transaction-issuance-termination determination section 720 supplies the STOP signal for master #1 serving as the first master 100 to the logical-product gate 741 through a signal line 721, the logical-product gate 741 masks the AVALID signal of the first master 100. By the same token, when the transaction-issuance-termination determination section 720 supplies the STOP signal for master #2 serving as the second master 100 to the logical-product gate 741 through a signal line 722, the logical-product gate 742 masks the AVALID signal of the second master 100.

The response-outputting control section 730 is a section for informing the previous-transaction-information management section 710 through a signal line 739 that an outstanding transfer has been completed when a response generated by a slave 200 has been passed on to a master 100.

FIG. 20 is a diagram showing a typical configuration of the previous-transaction-information management section 710 according to the fourth embodiment of the present disclosure. As shown in the figure, the previous-transaction-information management section 710 employs information-management queues 711-1 to 711-M provided for M masters 100 respectively. Each of the information-management queues 711-1 to 711-M is a queue for holding pieces of previous-transaction information by adoption of the FIFO technique. In this case, it is assumed that a piece of previous-transaction information held in an information-management queue 711 includes a target-slave number TGT. Thus, by making use of the information-management queues 711-1 to 711-M, it is possible to manage target-slave numbers TGT and information on an order in which transactions are issued by masters 100. The previous-transaction-information management section 710 outputs previous-transaction information to the transaction-issuance-termination determination section 720 through a signal line 719.

When the transaction-issuance-termination determination section 720 allows a request made by a master 100 as a request for an access to a slave 200, the transaction-issuance-termination determination section 720 supplies the target-slave number of the slave 200 to the previous-transaction-information management section 710 through a signal line 729. Then, the previous-transaction-information management section 710 registers the target slave number on an information-management queue 711 selected from the information-management queues 711-1 to 711-M as a queue provided for the master 100.

In addition, when a slave 200 transmits a response to a master 100 through the response-outputting control section 730, the response-outputting control section 730 notifies the previous-transaction-information management section 710 of a target-slave number assigned to the slave 200 through a signal line 739. Then, the previous-transaction-information management section 710 deletes the target-slave number from an information-management queue 711 selected from the information-management queues 711-1 to 711-M as a queue provided for the master 100.

Figure 21A:
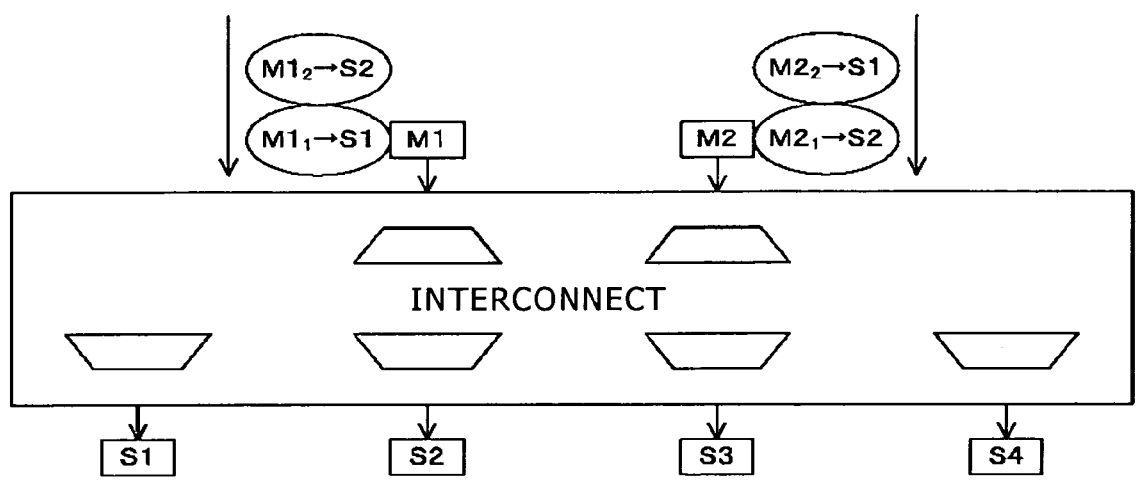
FIGS. 21A to 21C are diagrams showing typical operations to register previous-transaction information on an information-management queue employed in the previous-transaction-information management section according to the fourth embodiment of the present disclosure.
Figure 21B:
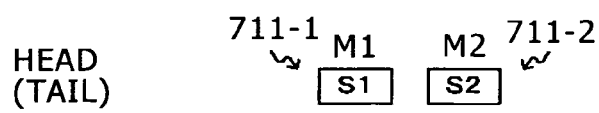
Figure 21C:
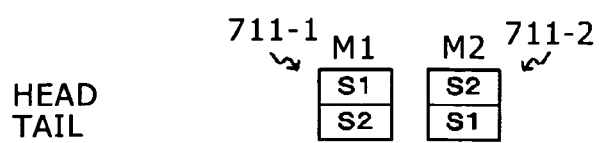

FIGS. 21A to 21C are diagrams showing typical operations to register previous-transaction information on an information-management queue 711 according to the fourth embodiment of the present disclosure. First of all, as shown in FIG. 21A, master M1 serving as the first master 100 issues transaction $M1_1$ to slave S1 serving as the first slave 200 whereas master M2 serving as the second master 100 issues transaction $M2_1$ to slave S2 serving as the second slave 200. At that time, as shown in FIG. 21B, slave number S1 assigned to the first slave 200 (or slave S1) is registered at the head of an information-management queue 711-1 provided for the first master 100 (or master M1) whereas slave number S2 assigned to the second slave 200 (or slave S2) is registered at the head of an information-management queue 711-2 provided for the second master 100 (or master M2).

Then, also as shown in FIG. 21A, the first master 100 (or master M1) issues transaction $M1_2$ to the second slave 200 (or slave S2) whereas the second master 100 (or master M2) issues transaction $M2_2$ to the first slave 200 (or slave S1). At that time, as shown in FIG. 21C, slave number S2 assigned to the second slave 200 (or slave S2) is registered at the tail of the information-management queue 711-1 provided for the first master 100 (or master M1) whereas slave number S1 assigned to the first slave 200 (or slave S1) is registered at the tail of the information-management queue 711-2 provided for the second master 100 (or master M2).

Figure 22A:
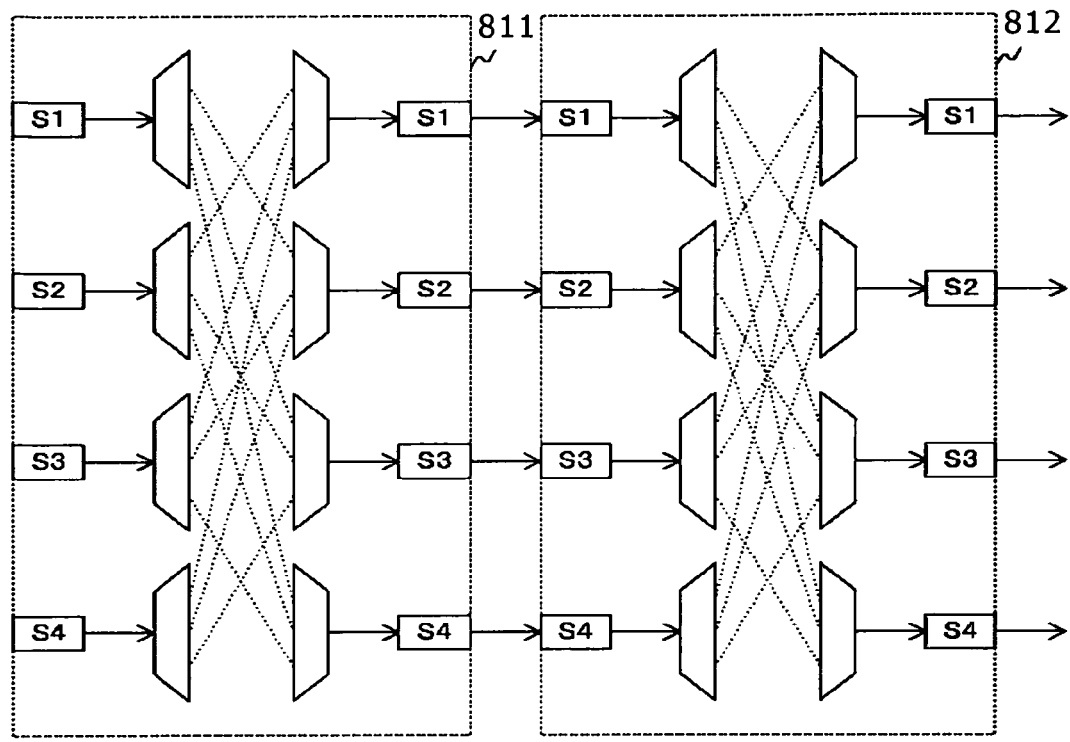
FIGS. 22A and 22B are diagrams each to be referred to in description of a deadlock determination technique adopted by a transaction-issuance-termination determination section employed in the deadlock avoidance circuit to serve as a section according to the fourth embodiment of the present disclosure.
Figure 22B:
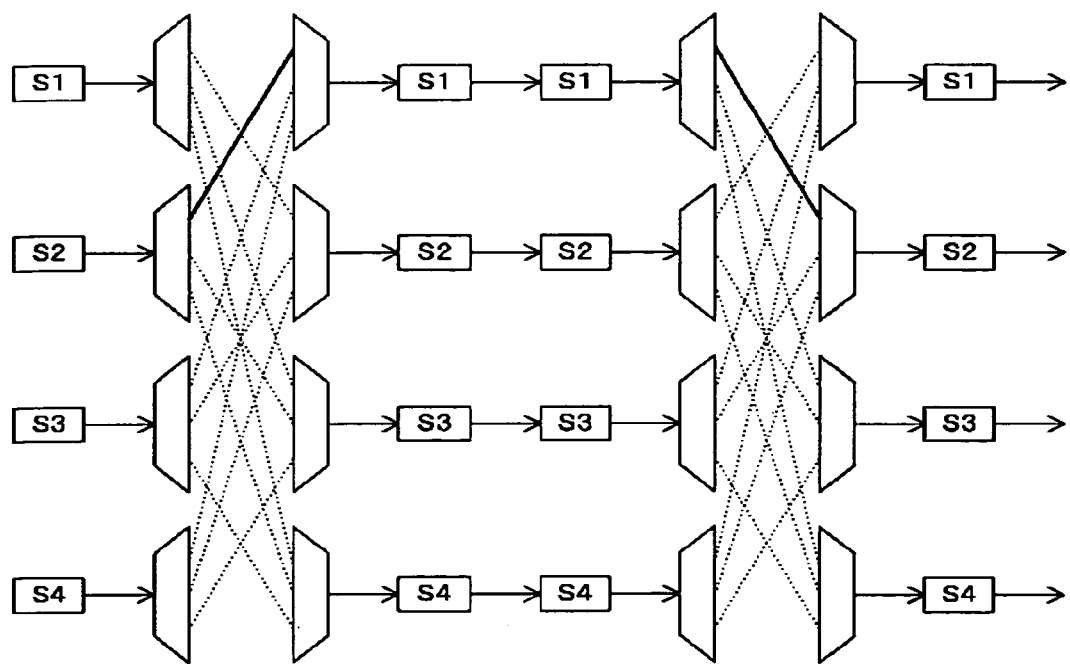

FIGS. 22A and 22B are diagrams each referred to in the following description of a deadlock determination technique adopted by the transaction-issuance-termination determination section 720 according to the fourth embodiment of the present disclosure. The transaction-issuance-termination determination section 720 makes use of virtual circuits 811 and 822 shown in FIG. 22A in order to determine a deadlock performance. The first virtual circuit 811 is a block representing interdependence relations among accesses made by the first master 100 (or master M1) whereas the second virtual circuit 812 is a block representing interdependence relations among accesses made by the second master 100 (or master M2). Every input terminal of each of the virtual circuits 811 and 822 is assigned to one of slaves 200 whereas every output terminal of each of the virtual circuits 811 and 822 is assigned to one of the slaves 200 in order to represent an interdependence relation in accordance with the existence/nonexistence of connections between the input and output terminals. The typical example shown in the FIGS. 22A and 22B have four slaves 200.

The typical example shown in FIGS. 21A to 21C is used as follows. First of all, in master M1 serving as the first master 100, there is shown a dependence relation from the slave number S2 to the slave number S1. Thus, a connection from an input terminal S2 to an output terminal S1 in the first virtual circuit 811 is assumed. In addition, in master M2 serving as the second master 100, there is shown a dependence relation from the slave number S1 to the slave number S2. Thus, a connection from an input terminal S1 to an output terminal S2 in the second virtual circuit 812 is assumed. Then, the virtual circuits 811 and 812 are connected to each other in series. A signal supplied to an input terminal of the first virtual circuit 811 is compared with a signal output from an output terminal of the second virtual circuit 812 and, if the same level is detected from the two signals, a (cross-multiply) dependence relation in the access is determined. In the typical example shown in the same figure, the slave number S2 corresponds to this.

Figure 23:
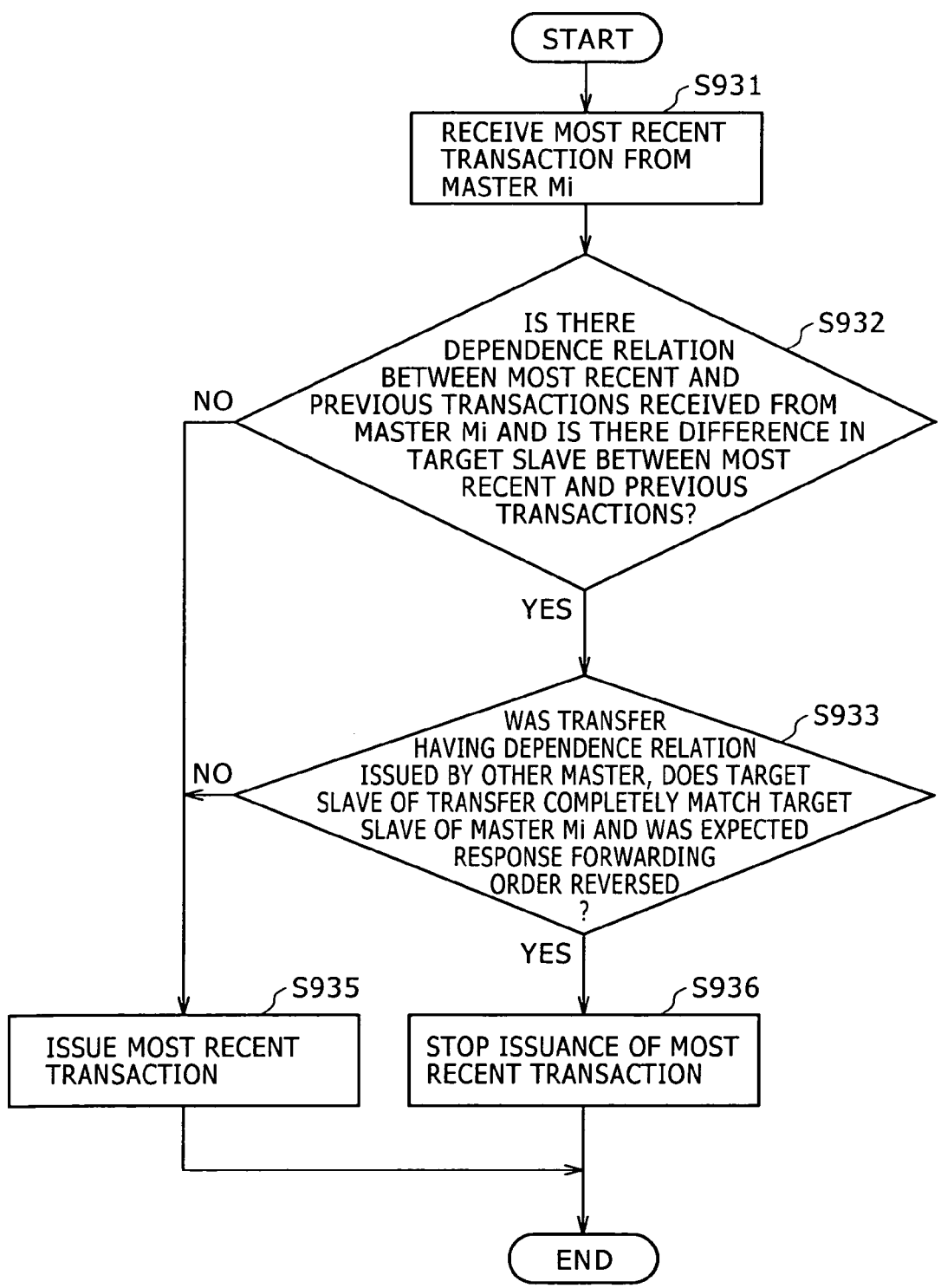
FIG. 23 shows a typical flowchart representing transaction-action determination processing carried out by the transaction-issuance-termination determination section employed in the deadlock avoidance circuit to serve as a section according to the fourth embodiment of the present disclosure.

FIG. 23 shows a typical flowchart representing transaction-action determination processing carried out by the transaction-issuance-termination determination section 720 according to the fourth embodiment of the present disclosure. As shown in the figure, the flowchart begins with a step S931 at which a most recent transaction is received from master Mi. When the most recent transaction is received from master Mi, the transaction-issuance-termination determination section 720 determines whether or not the most recent transaction can be passed on to a slave 200 as follows.

First of all, at the following step S932, the transaction-issuance-termination determination section 720 checks transactions received from the same master. That is to say, the transaction-issuance-termination determination section 720 determines whether or not there is a dependence relation between the most recent transaction received from master Mi and previous transactions also received from master Mi and whether or not the most recent transaction has a target slave different from those of the previous transactions. If there is no dependence relation between the most recent transaction and previous transactions, it is not necessary to take a deadlock into consideration. Thus, in this case, the flow of the transaction-action determination processing goes on to a step S935 at which the most recent transaction is passed on to the slave 200. Even if there is a dependence relation between the most recent transaction and previous transactions, the target slave of the most recent transaction may match those of the previous transactions. In this case, overtaking does not occur as long as the slave 200 sustains the order. Thus, the flow of the transaction-action determination processing also goes on to the step S935.

If there is a dependence relation between the most recent transaction and previous transactions and the most recent transaction has a target slave different from those of the previous transactions, on the other hand, the flow of the transaction-action determination processing goes on to a step S933.

Then, at the following step S933, the transaction-issuance-termination determination section 720 checks transactions received from master Mi and another master. That is to say, the transaction-issuance-termination determination section 720 determines whether or not the other master has issued a transfer having a dependence relation, whether or not the target slave of the transfer completely matches the target slave of master Mi and whether or not the expected response forwarding order has been reversed. The existence of such a relation implies that there is a cross-multiply dependence relation. Thus, in this case, the flow of the transaction-action determination processing goes on to a step S36 at which an operation to pass on the most recent transaction is stopped. If there is no cross-multiply dependence relation, on the other hand, the flow of the transaction-action determination processing goes on to the step S35 at which the operation to pass on the most recent transaction to the slave 200 is carried out.

It is to be noted that, in order to detect a cross-multiply dependence relation, the virtual circuits 811 and 822 explained earlier by referring to FIGS. 22A and 22B can be used.

Deadlock Determination

Figure 24A:
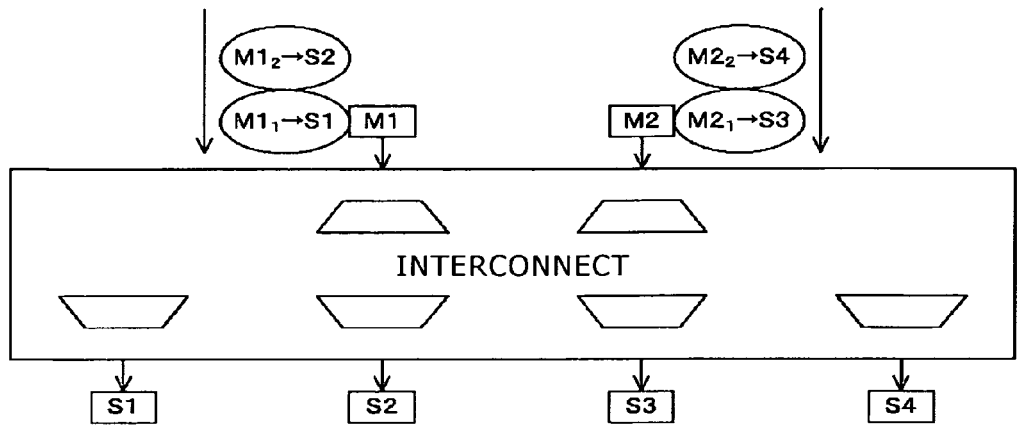
FIGS. 24A to 24C are diagrams to be referred to in description of a first typical deadlock determination technique adopted by the fourth embodiment of the present disclosure.
Figure 24B:
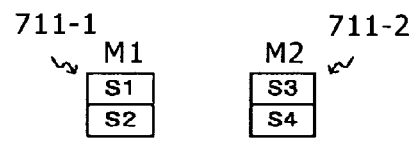
Figure 24C:
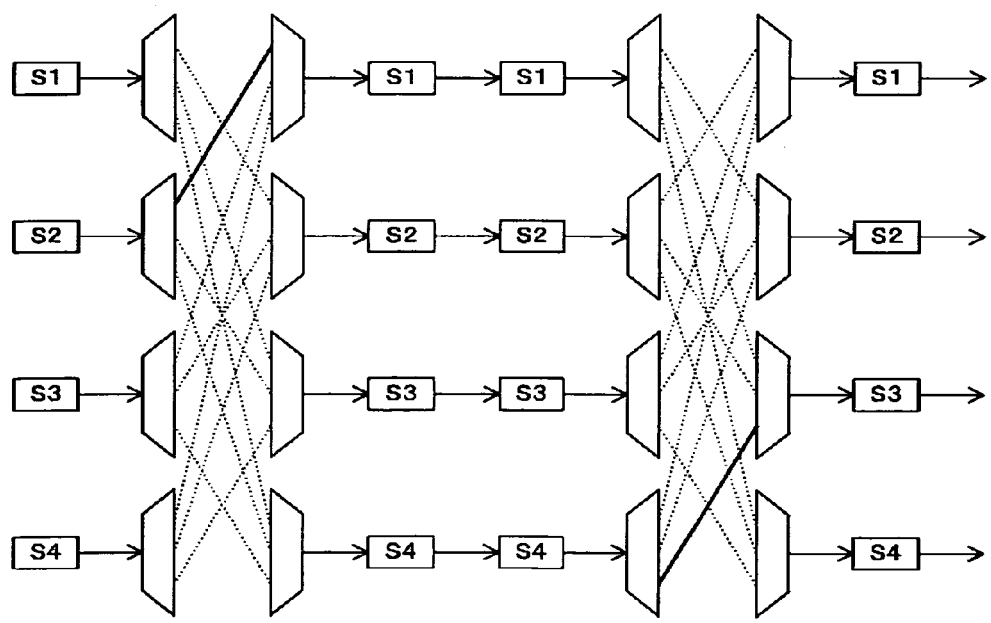

FIGS. 24A to 24C are diagrams referred to in the following description of a first typical deadlock determination technique adopted by the fourth embodiment of the present disclosure. In the typical case shown in FIG. 24A, first of all, master M1 serving as the first master 100 issues transaction $M1_1$ to slave S1 serving as the first slave 200 whereas master M2 serving as the second master 100 issues transaction $M2_1$ to slave S3 serving as the third slave 200. At that time, as shown in FIG. 24B, slave number S1 assigned to the first slave 200 (or slave S1) is registered at the head of an information-management queue 711-1 provided for the first master 100 (or master M1) whereas slave number S3 assigned to the third slave 200 (or slave S3) is registered at the head of an information-management queue 711-2 provided for the second master 100 (or master M2).

Then, also as shown in FIG. 24A, the first master 100 (or master M1) issues transaction $M1_2$ to the second slave 200 (or slave S2) whereas the second master 100 (or master M2) issues transaction $M2_2$ to the fourth slave 200 (or slave S4). At that time, also as shown in FIG. 24B, slave number S2 assigned to the second slave 200 (or slave S2) is registered at the tail of the information-management queue 711-1 provided for the first master 100 (or master M1) whereas slave number S4 assigned to the fourth slave 200 (or slave S4) is registered at the tail of the information-management queue 711-2 provided for the second master 100 (or master M2).

Thus, in a block representing dependence relations between accesses made by the first master 100 (or master M1), a connection from an input terminal S2 to an output terminal S1 is assumed as shown on the left-hand side of FIG. 24C. By the same token, in a block representing dependence relations between accesses made by the second master 100 (or master M2), a connection from an input terminal S4 to an output terminal S3 is assumed as shown on the right-hand side of FIG. 24C. As a result, it is concluded that a cross-multiply dependence relation is not detected.

Figure 25A:
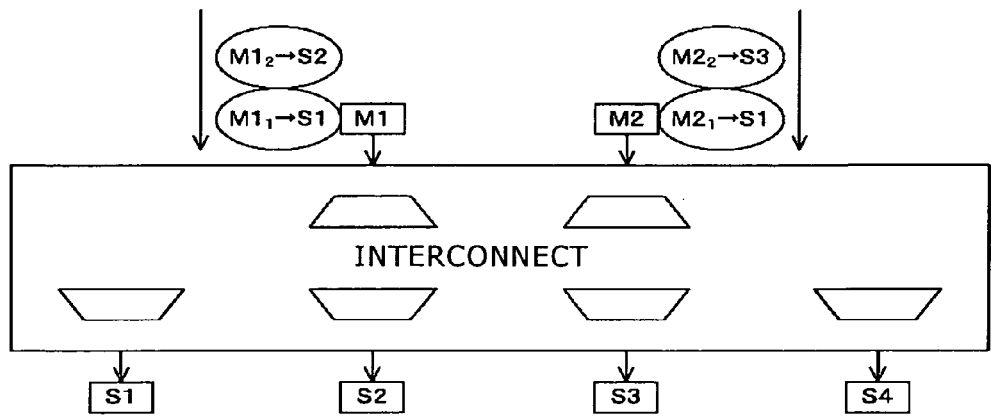
FIGS. 25A to 25C are diagrams to be referred to in description of a second typical deadlock determination technique adopted by the fourth embodiment of the present disclosure.
Figure 25B:
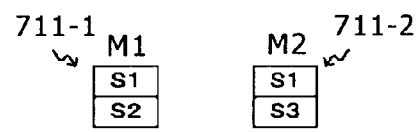
Figure 25C:
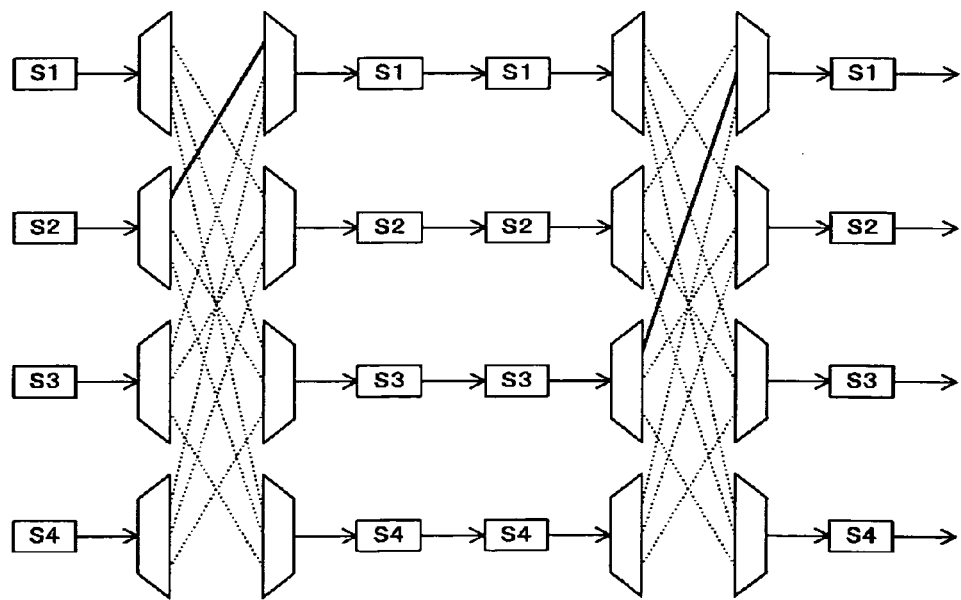

FIGS. 25A to 25C are diagrams referred to in the following description of a second typical deadlock determination technique adopted by the fourth embodiment of the present disclosure. In the typical case shown in FIG. 25A, first of all, master M1 serving as the first master 100 issues transaction $M1_1$ to slave S1 serving as the first slave 200 whereas master M2 serving as the second master 100 issues transaction $M2_1$ also to slave S1. At that time, as shown in FIG. 25B, slave number S1 assigned to the first slave 200 (or slave S1) is registered at the head of an information-management queue 711-1 provided for the first master 100 (or master M1) whereas slave number S1 is also registered at the head of an information-management queue 711-2 provided for the second master 100 (or master M2).

Then, also as shown in FIG. 25A, the first master 100 (or master M1) issues transaction $M1_2$ to the second slave 200 (or slave S2) whereas the second master 100 (or master M2) issues transaction $M2_2$ to the third slave 200 (or slave S3). At that time, also as shown in FIG. 25B, slave number S2 assigned to the second slave 200 (or slave S2) is registered at the tail of the information-management queue 711-1 provided for the first master 100 (or master M1) whereas slave number S3 assigned to the third slave 200 (or slave S3) is registered at the tail of the information-management queue 711-2 provided for the second master 100 (or master M2).

Thus, in a block representing dependence relations between accesses made by the first master 100 (or master M1), a connection from an input terminal S2 to an output terminal S1 is assumed as shown on the left-hand side of FIG. 25C. By the same token, in a block representing dependence relations between accesses made by the second master 100 (or master M2), a connection from an input terminal S3 to an output terminal S1 is assumed as shown on the right-hand side of FIG. 25C. As a result, it is concluded that a cross-multiply dependence relation is not detected.

Figure 26A:
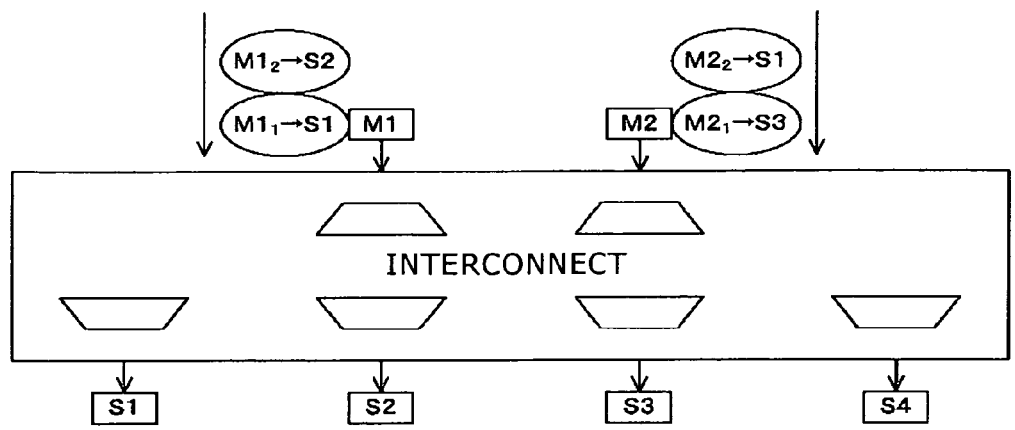
FIGS. 26A to 26C are diagrams to be referred to in description of a third typical deadlock determination technique adopted by the fourth embodiment of the present disclosure.
Figure 26B:
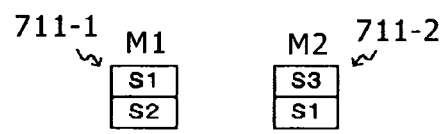
Figure 26C:
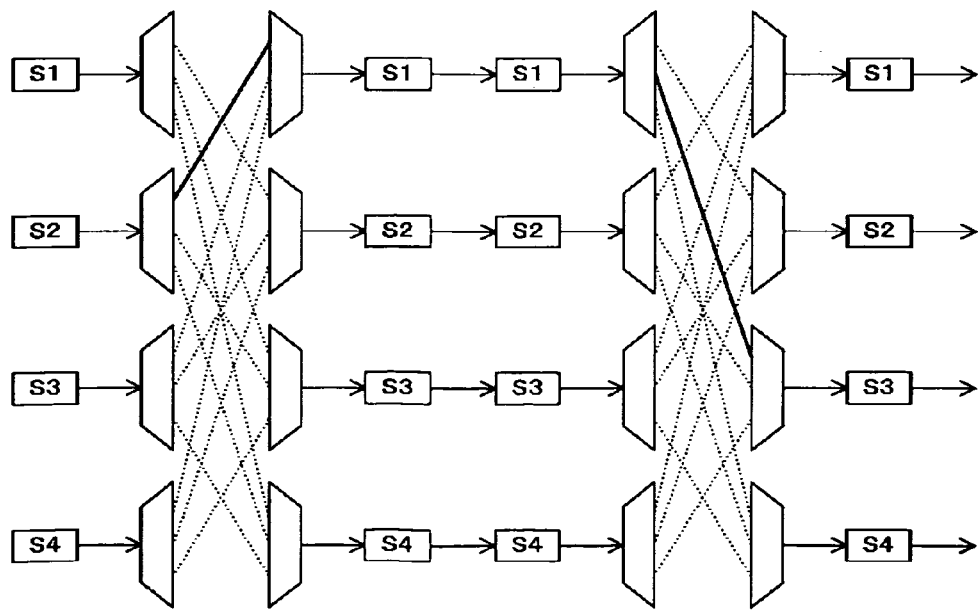

FIGS. 26A to 26C are diagrams referred to in the following description of a third typical deadlock determination technique adopted by the fourth embodiment of the present disclosure. In the typical case shown in FIG. 26A, first of all, master M1 serving as the first master 100 issues transaction $M1_1$ to slave S1 serving as the first slave 200 whereas master M2 serving as the second master 100 issues transaction $M2_1$ to slave S3 serving as the third slave 200. At that time, as shown in FIG. 26B, slave number S1 assigned to the first slave 200 (or slave S1) is registered at the head of an information-management queue 711-1 provided for the first master 100 (or master M1) whereas slave number S3 assigned to the third slave 200 (or slave S3) is registered at the head of an information-management queue 711-2 provided for the second master 100 (or master M2).

Then, also as shown in FIG. 26A, the first master 100 (or master M1) issues transaction $M1_2$ to the second slave 200 (or slave S2) whereas the second master 100 (or master M2) issues transaction $M2_2$ to the first slave 200 (or slave S1). At that time, also as shown in FIG. 26B, slave number S2 assigned to the second slave 200 (or slave S2) is registered at the tail of the information-management queue 711-1 provided for the first master 100 (or master M1) whereas slave number S1 assigned to the first slave 200 (or slave S1) is registered at the tail of the information-management queue 711-2 provided for the second master 100 (or master M2).

Thus, in a block representing dependence relations between accesses made by the first master 100 (or master M1), a connection from an input terminal S2 to an output terminal S1 is assumed as shown on the left-hand side of FIG. 26C. By the same token, in a block representing dependence relations between accesses made by the second master 100 (or master M2), a connection from an input terminal S1 to an output terminal S3 is assumed as shown on the right-hand side of FIG. 26C. As a result, it is concluded that a cross-multiply dependence relation is not detected.

Figure 27A:
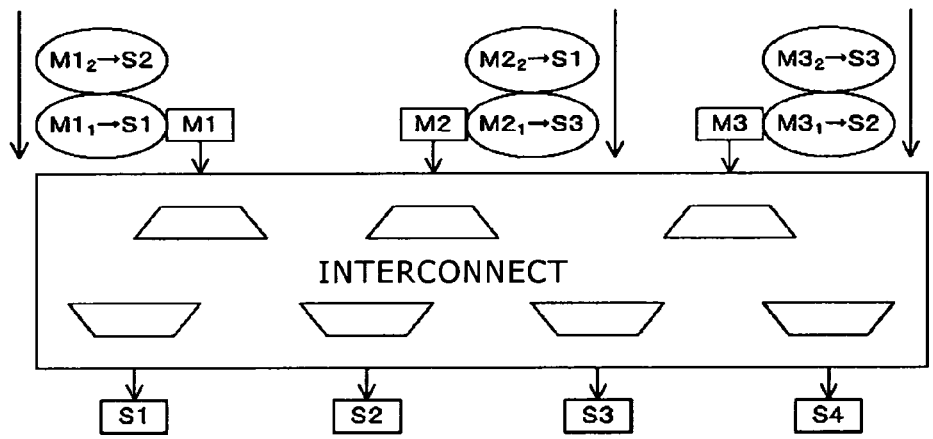
FIGS. 27A to 27C are diagrams to be referred to in description of a fourth typical deadlock determination technique adopted by the fourth embodiment of the present disclosure.
Figure 27B:
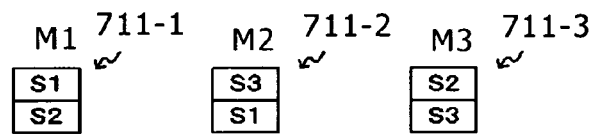
Figure 27C:
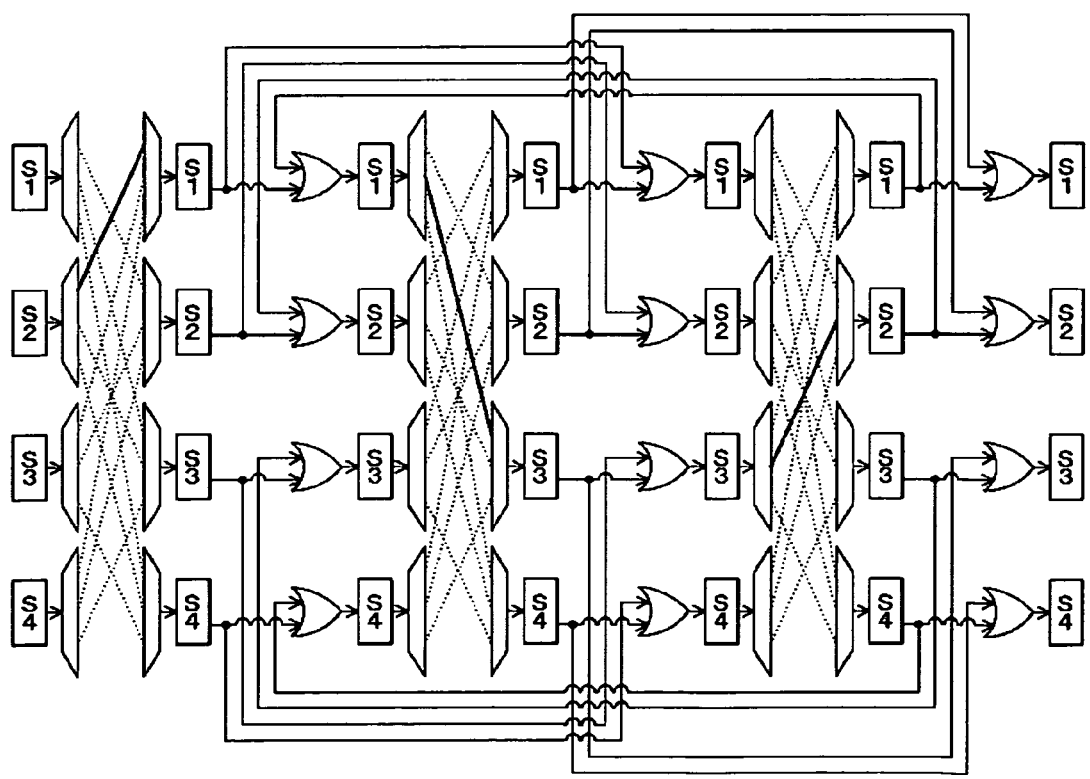

FIGS. 27A to 27C are diagrams referred to in the following description of a fourth typical deadlock determination technique adopted by the fourth embodiment of the present disclosure. In the typical case shown in the figure, three masters 100 also referred to as masters M1, M2 and M3 respectively are assumed. Thus, three information-management queues 711-1 to 711-3 are provided for the three masters 100 respectively. For this reason, three virtual circuits for detecting a cross-multiply dependence relation are provided at three stages and connected to each other in series. In addition, each of the virtual circuits supplies its outputs to other virtual circuits by way of logical-sum gates.

In the typical case shown in FIG. 27A, first of all, master M1 serving as the first master 100 issues transaction $M1_1$ to slave S1 serving as the first slave 200 whereas master M2 serving as the second master 100 issues transaction $M2_1$ to slave S3 serving as the third slave 200 and master M3 serving as the third master 100 issues transaction M31 to slave S2 serving as the second slave 200. At that time, as shown in FIG.

27B, slave number S1 assigned to the first slave 200 (or slave S1) is registered at the head of an information-management queue 711-1 provided for the first master 100 (or master M1) whereas slave number S3 assigned to the third slave 200 (or slave S3) is registered at the head of an information-management queue 711-2 provided for the second master 100 (or master M2) and slave number S2 assigned to the second slave 200 (or slave S2) is registered at the head of an information-management queue 711-3 provided for the third master 100 (or master M3).

Then, also as shown in FIG. 27A, the first master 100 (or master M1) issues transaction $M1_2$ to the second slave 200 (or slave S2) whereas the second master 100 (or master M2) issues transaction $M2_2$ to the first slave 200 (or slave S1) and the third master 100 (or master M3) issues transaction $M32$ to the third slave 200 (or slave S3). At that time, also as shown in FIG. 27B, slave number S2 assigned to the second slave 200 (or slave S2) is registered at the tail of the information-management queue 711-1 provided for the first master 100 (or master M1) whereas slave number S1 assigned to the first slave 200 (or slave S1) is registered at the tail of the information-management queue 711-2 provided for the second master 100 (or master M2) and slave number S3 assigned to the third slave 200 (or slave S3) is registered at the tail of the information-management queue 711-3 provided for the third master 100 (or master M3).

Thus, in a block representing dependence relations between accesses made by the first master 100 (or master M1), a connection from an input terminal S2 to an output terminal S1 is assumed as shown on the left-hand side of FIG. 27C. By the same token, in a block representing dependence relations between accesses made by the second master 100 (or master M2), a connection from an input terminal S1 to an output terminal S3 is assumed as shown in the middle of FIG. 26C. In the same way, a connection from an input terminal S3 to an output terminal S2 is assumed as shown on the right-hand side of FIG. 26C. As a result, it is concluded that a cross-multiply dependence relation is detected.

As described above, in accordance with the fourth embodiment of the present disclosure, the operation to pass on a transaction is stopped if a cross-multiply dependence relation is detected. It is thus possible to prevent a deadlock from occurring.

That is to say, in accordance with the embodiments of the present disclosure, it is possible to prevent a deadlock from occurring while reducing the performance deterioration in comparison with the existing technologies. In addition, by selecting a deadlock avoidance mechanism proper for the required performance level of the interconnect and restrictions imposed on the interconnect, a split bus system can be implemented.

It is to be noted that the embodiments of the present disclosure are no more than typical implementations of the deadlock avoidance circuit. As is obvious from the descriptions of the embodiments of the present disclosure, the items of the embodiments of the present disclosure are associated with their respective invention particulars described in the range of invention claims. By the same token, the invention particulars described in the range of the invention claims are associated with their respective items described in the embodiments of the present disclosure as items each having the same name as one of the invention particulars. However, implementations of the present disclosure are by no means limited to the embodiments of the present disclosure. That is to say, it is possible to implement the present disclosure by further changing the embodiments to modified versions within a range not deviating from essentials of the present disclosure.

The present disclosure contains subject matter related to that disclosed in Japanese Priority Patent Application JP 2010-218612 filed in the Japan Patent Office on Sep. 29, 2010, the entire content of which is hereby incorporated by reference.

What is claimed is:

1. A deadlock avoidance method comprising:
managing information on previous transactions issued before by a master to any of a plurality of slaves;
determining whether or not a most recent transaction newly issued by the master is a cause of a deadlock on the basis of the information on the previous transactions;
terminating issuance of the most recent transaction if the most recent transaction is determined to be a cause of a deadlock; and
controlling an operation to pass on responses generated by the slaves to the master so as to sustain a response outputting order expected in advance if responses have been output by the slaves to the master in response to the previous transactions in an order different from the response outputting order expected in advance,
saving a response if the response has been output by any of the slaves to the master in response to one of the previous transaction in an order different from the response outputting order expected in advance.

2. The deadlock avoidance method according to claim 1, wherein
the step of determining whether or not the most recent transaction newly issued by the master is the cause of the deadlock includes determining whether or not a most recent transaction newly issued by the master is a cause of a deadlock on the basis of the capacity of the response saving buffer.

3. The deadlock avoidance method according to claim 1 wherein in the step of saving the response if the response has been output by any of the slaves to the master, the response is saved in any of the slaves.

4. The deadlock avoidance method according to claim 1, wherein, if a response has been output by any of the slaves to the master in response to a specific one of the previous transactions in an order different from the response outputting order expected in advance, the response is discarded and the specific previous transaction for the discarded response is reissued.

5. A deadlock avoidance circuit comprising:
a previous-transaction-information management section configured to manage information on previous transactions issued before by a master associated with the deadlock avoidance circuit to any of a plurality of slaves;
a transaction-issuance-termination determination section configured to determine whether or not a most recent transaction newly issued by the master is a cause of a deadlock on the basis of the information on the previous transactions and configured to terminate issuance of the most recent transaction if the most recent transaction is determined to be a cause of a deadlock;
a response-outputting control section configured to control an operation to pass on responses generated by the slaves to the master so as to sustain a response outputting order expected in advance if responses have been output by the slaves to the master in response to the previous transactions in an order different from the response outputting order expected in advance; and
a response saving buffer configured to save a response if the response has been output by any of the slaves to the master in response to one of the previous transaction in an order different from the response outputting order expected in advance.

6. The deadlock avoidance circuit according to claim 5, wherein
the transaction-issuance-termination determination section determines whether or not a most recent transaction newly issued by the master is a cause of a deadlock on the basis of the capacity of the response saving buffer.

7. The deadlock avoidance circuit according to claim 5, wherein the response saving buffer can also be provided in any of the slaves.

8. The deadlock avoidance circuit according to claim 6, wherein the response saving buffer can also be provided in any of the slaves.

9. The deadlock avoidance circuit according to claim 5, wherein, if a response has been output by any of the slaves to the master in response to a specific one of the previous transactions in an order different from the response outputting order expected in advance, the response-outputting control section carries out control to discard the response and reissue the specific previous transaction for the discarded response.

10. A bus system comprising
at least one master,
a plurality of slaves, and
a bus configured to connect the masters to the slaves, wherein
the bus includes
a deadlock avoidance circuit according to claim 5 for each of the masters.

11. A deadlock avoidance circuit comprising:
a previous-transaction-information management section configured to manage information on previous transactions issued before by a master associated with said deadlock avoidance circuit to any of a plurality of slaves;
a transaction-issuance-termination determination section configured to determine whether or not a most recent transaction newly issued by said master is a cause of a deadlock on the basis of said information on said previous transactions and configured to terminate issuance of said most recent transaction if said most recent transaction is determined to be a cause of a deadlock; and
a response-outputting control section configured to control an operation to pass on responses generated by said slaves to said master so as to sustain a response outputting order expected in advance if responses have been output by said slaves to said master in response to said previous transactions in an order different from said response outputting order expected in advance,
said deadlock avoidance circuit further having a response saving buffer configured to save a response if said response has been output by any of said slaves to said master in response to one of said previous transaction in an order different from said response outputting order expected in advance, wherein
said transaction-issuance-termination determination section determines whether or not a most recent transaction newly issued by said master is a cause of a deadlock on the basis of the capacity of said response saving buffer.

12. The deadlock avoidance circuit according to claim 11 wherein said response saving buffer can also be provided in any of said slaves.

13. The deadlock avoidance circuit according to claim 11, wherein, if a response has been output by any of said slaves to said master in response to a specific one of said previous transactions in an order different from said response outputting order expected in advance, said response-outputting control section carries out control to discard said response and reissue said specific previous transaction for said discarded response.

14. A bus system comprising
at least one master,
a plurality of slaves, and
a bus configured to connect said masters to said slaves, wherein
said bus includes
a deadlock avoidance circuit according to claim 11 for each of said masters.

15. A deadlock avoidance circuit comprising:
a previous-transaction-information management section configured to manage previous-transaction information including identifiers of a plurality of slaves serving as targets of previous transactions issued previously by a plurality of masters to any of said slaves and the order of said identifiers;
a transaction-issuance-termination determination section configured to determine whether or not a most recent transaction newly issued by any of said masters is a cause of a deadlock on the basis of said previous-transaction information and configured to terminate said issuance of said most recent transaction if said most recent transaction is determined to be a cause of a deadlock;
a response-outputting control section configured to control an operation to pass on responses generated by said slaves to one of said masters so as to sustain a response outputting order expected in advance if responses have been output by said slaves to said one of said masters in response to said previous transactions in an order different from said response outputting order expected in advance; and
a response saving buffer configured to save a response if said response has been output by any of said slaves to said one of said masters in response to one of said previous transaction in an order different from said response outputting order expected in advance, wherein
said transaction-issuance-termination determination section determines whether or not a most recent transaction newly issued by said one of said masters is a cause of a deadlock on the basis of the capacity of said response saving buffer.

16. A bus system comprising
a plurality of masters,
a plurality of slaves, and
a bus according to claim 15 configured to connect said masters to said slaves.

* * * * *